(12) United States Patent
Hoshina et al.

(10) Patent No.: US 11,735,777 B2
(45) Date of Patent: Aug. 22, 2023

(54) ELECTRODE GROUP, SECONDARY BATTERY, BATTERY PACK, AND VEHICLE

(71) Applicant: KABUSHIKI KAISHA TOSHIBA, Tokyo (JP)

(72) Inventors: Keigo Hoshina, Yokohama (JP); Kazuomi Yoshima, Yokohama (JP); Yasunobu Yamashita, Tokyo (JP); Yuta Kanai, Tokyo (JP); Yasuhiro Harada, Isehara (JP); Norio Takami, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 101 days.

(21) Appl. No.: 17/186,570

(22) Filed: Feb. 26, 2021

(65) Prior Publication Data
US 2022/0093975 A1 Mar. 24, 2022

(30) Foreign Application Priority Data

Sep. 18, 2020 (JP) .................................. 2020-156823
Feb. 16, 2021 (JP) .................................. 2021-022684

(51) Int. Cl.
*H01M 10/0587* (2010.01)
*H01M 4/485* (2010.01)
(Continued)

(52) U.S. Cl.
CPC ......... *H01M 10/0587* (2013.01); *B60L 50/64* (2019.02); *H01M 4/485* (2013.01);
(Continued)

(58) Field of Classification Search
None
See application file for complete search history.

(56) References Cited

U.S. PATENT DOCUMENTS

| | | | |
|---|---|---|---|
| 2001/0004505 A1* | 6/2001 | Kim | H01M 50/553 429/180 |
| 2004/0131941 A1* | 7/2004 | Belharouak | C01G 23/003 429/231.95 |

(Continued)

FOREIGN PATENT DOCUMENTS

| | | | |
|---|---|---|---|
| JP | 2010-186683 A | | 8/2010 |
| JP | 2012174579 A | * | 9/2012 |
| JP | 2017-208255 A | | 11/2017 |

OTHER PUBLICATIONS www.espacenet.com machine translation of the detailed description of JP 2012-174579A. (Year: 2012).*

(Continued)

*Primary Examiner* — Gregg Cantelmo
(74) *Attorney, Agent, or Firm* — Maier & Maier, PLLC

(57) ABSTRACT

According to one embodiment, provided is an electrode group including a positive electrode and a negative electrode that includes a titanium-containing oxide. The electrode group has a wound structure of a flat shape, in which a stack including the positive electrode and the negative electrode is wound such that a center of the wound structure lies along a first direction. At least a part of a portion of the negative electrode, positioned within a thickness of 0.2 t from an innermost lap along a longest straight line in a wound cross-section of the wound structure orthogonal to the first direction with respect to a thickness t from the innermost lap to an outermost lap along the longest straight line, includes a slit that lies along the first direction.

11 Claims, 8 Drawing Sheets

(51) Int. Cl.
*H01M 4/505* (2010.01)
*H01M 10/0525* (2010.01)
*B60L 50/64* (2019.01)
*H01M 4/525* (2010.01)

(52) U.S. Cl.
CPC ........... *H01M 4/505* (2013.01); *H01M 4/525* (2013.01); *H01M 10/0525* (2013.01); *H01M 2220/20* (2013.01)

(56) References Cited

U.S. PATENT DOCUMENTS

2007/0238023 A1* 10/2007 Gorshkov ........... H01M 10/052
423/598
2014/0044997 A1* 2/2014 Inagaki ................. H01M 4/525
429/231.1
2018/0277828 A1* 9/2018 Namiki ............. H01M 10/0525

OTHER PUBLICATIONS

Nakai, I. et al., "Funmatsu X sen Kaiseki no Jissai (Reality of Powder X-Ray Analysis)," X-Ray Analysis Investigation Conversazione, The Japan Society for Analytical Chemistry, $1^{st}$ Edition, 2002, 59 pages (with English translation).

\* cited by examiner

ELECTRODE GROUP, SECONDARY BATTERY, BATTERY PACK, AND VEHICLE

CROSS-REFERENCE TO RELATED APPLICATIONS

This application is based upon and claims the benefit of priority from Japanese Patent Application No. 2020-156823, filed Sep. 18, 2020 and Japanese Patent Application No. 2021-22684, filed Feb. 16, 2021, the entire contents of all of which are incorporated herein by reference.

FIELD

Embodiments described herein relate generally to an electrode group, a secondary battery, a battery pack, and a vehicle.

BACKGROUND

As batteries of high energy density, lithium ion batteries in which charge and discharge is performed by movement of lithium ions between a negative electrode and a positive electrode, for example, nonaqueous electrolyte batteries have been actively researched.

Such nonaqueous electrolyte batteries are anticipated for use in middle to large scale power sources such as on-board applications and stationary applications, in addition to use as power sources for small-sized electronic devices. In such middle to large scale use, good life performance and high safety is demanded. Moreover, high energy density and input-output performance are also in demand.

DETAILED DESCRIPTION

Figure 1:
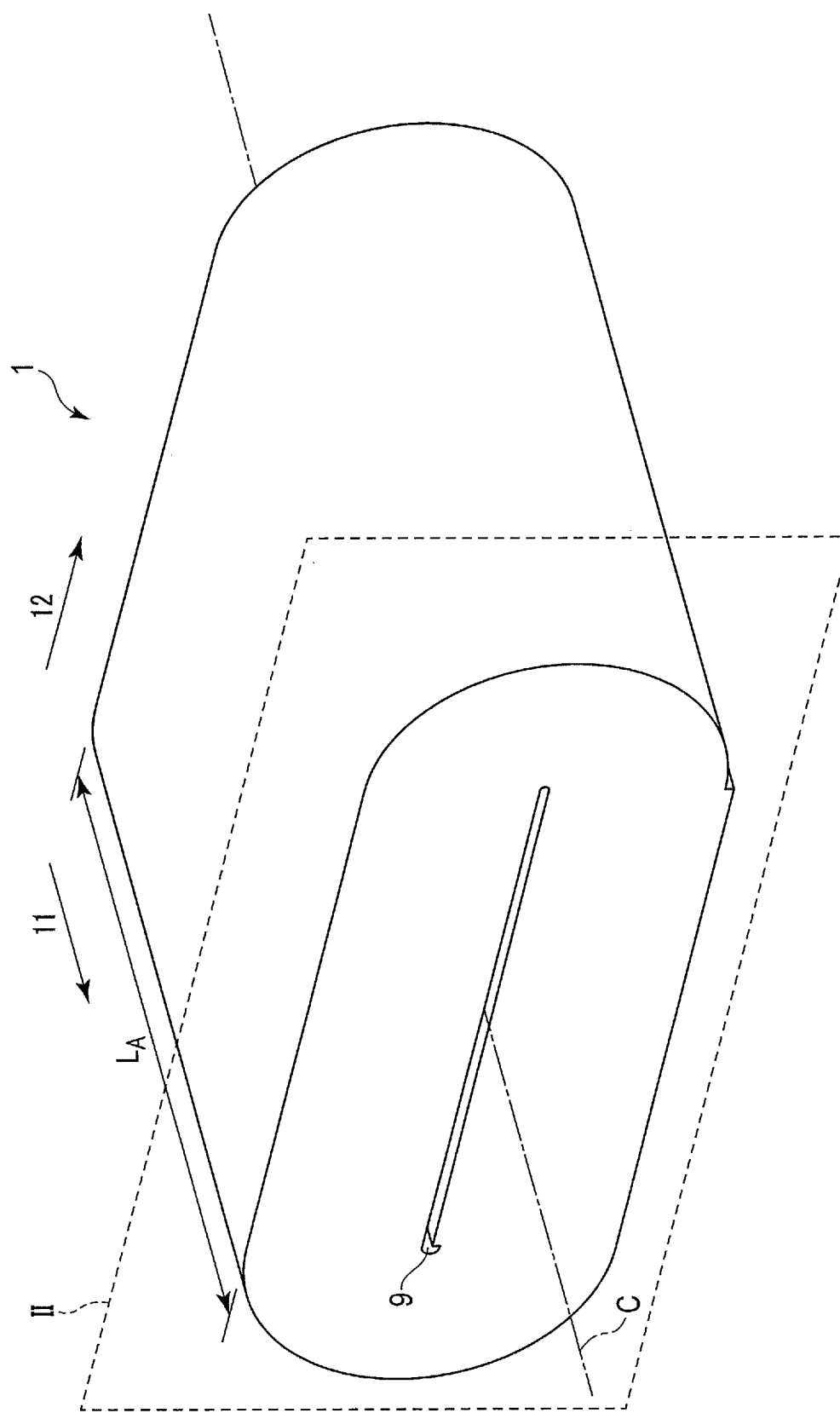
FIG. 1 is a perspective view schematically showing an example of an electrode group according to an embodiment.

According to one embodiment, provided is an electrode group including a positive electrode and a negative electrode that includes a titanium-containing oxide. The electrode group has a wound structure of a flat shape, in which a stack including the positive electrode and the negative electrode is wound such that a center of the wound structure lies along a first direction. A wound cross-section of the wound structure orthogonal to the first direction includes an innermost lap and an outermost lap. At least a part of a portion of the negative electrode, positioned within a thickness of 0.2 t from the innermost lap along a longest straight line in the wound cross-section with respect to a thickness t from the innermost lap to the outermost lap along the longest straight line, includes a slit that lies along the first direction.

According to another embodiment, provided is a secondary battery including an electrolyte and the electrode group according to the above embodiment.

According to a further other embodiment, provided is a battery pack including the secondary battery according to the above embodiment.

According to yet another embodiment, provided is a vehicle including the battery pack according to the above embodiment.

As a nonaqueous electrolyte battery having good life performance and high safety, a nonaqueous electrolyte battery that uses a titanium-containing composite oxide for a negative electrode is available. In order to obtain a higher energy density, such measures as increasing an amount of an electrode mixture and increasing an electrode density are considerable. However, an increase in an amount of an electrode mixture or an increase in an electrode density leads to an increase in a battery resistance, whereby input-output performance may degrade.

As examples of the form of a typical electrode group included in a nonaqueous electrolyte battery, a wound type and a stacked type can be cited. A wound electrode group is excellent in productivity but low in ability of having an electrolytic solution impregnated. Also, in a section of a wound electrode group where an arc-shaped curve is formed, a reaction between opposing electrodes (e.g., a negative electrode and a positive electrode as a counter electrode thereof) is less likely to occur, making the battery resistance apt to increase. In a portion closer to the innermost lap of the electrode group, a reaction between the opposing electrodes is less likely to occur.

Hereinafter, embodiments will be described with reference to the drawings. The same reference signs are applied to common components throughout the embodiments and overlapping explanations are omitted. Each drawing is a schematic view for describing the embodiment and promoting understanding thereof; though there may be differences in shape, size and ratio from those in an actual device, such specifics can be appropriately changed in design taking the following explanations and known technology into consideration.

First Embodiment

The electrode group according to the first embodiment includes a positive electrode and a negative electrode. The negative electrode includes a titanium-containing oxide. The electrode group has a flat wound structure, where a stack including the positive electrode and the negative electrode is wound in a manner where a center of winding lies along a first direction. A wound cross-section of the wound structure orthogonal to the first direction includes an innermost lap and an outermost lap. Of the negative electrode included in the electrode group, for a portion positioned within a thickness of 0.2 t from the innermost lap along a longest straight line in the wound cross-section with respect to a thickness t from the innermost lap to the outermost lap along the longest straight line, at least a part thereof is provided with a slit lying along the first direction.

The electrode group may be an electrode group for a battery.

The battery herein includes secondary batteries such as a lithium ion secondary battery and a nonaqueous electrolyte battery. By using the electrode group, a battery resistance value of a secondary battery can be reduced, allowing for high output performance.

The electrode group may further include a separator.

Figure 2:
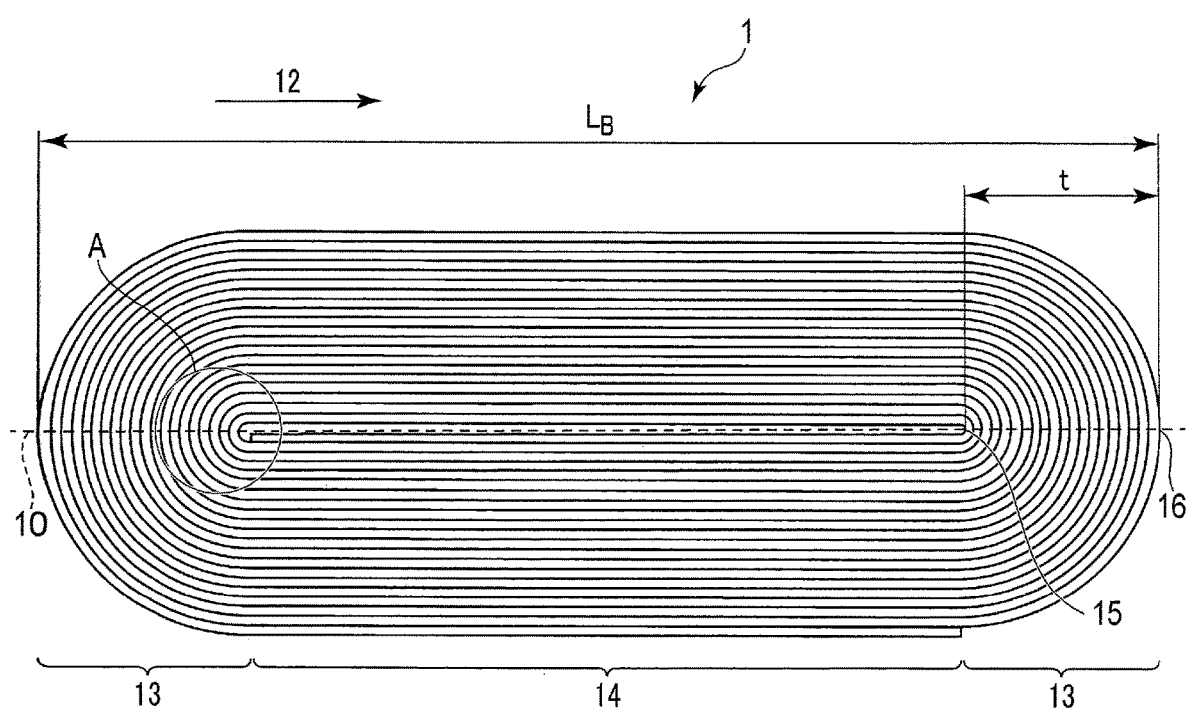
FIG. 2 is a schematic cross-sectional view along virtual plane II in FIG. 1.
Figure 3:
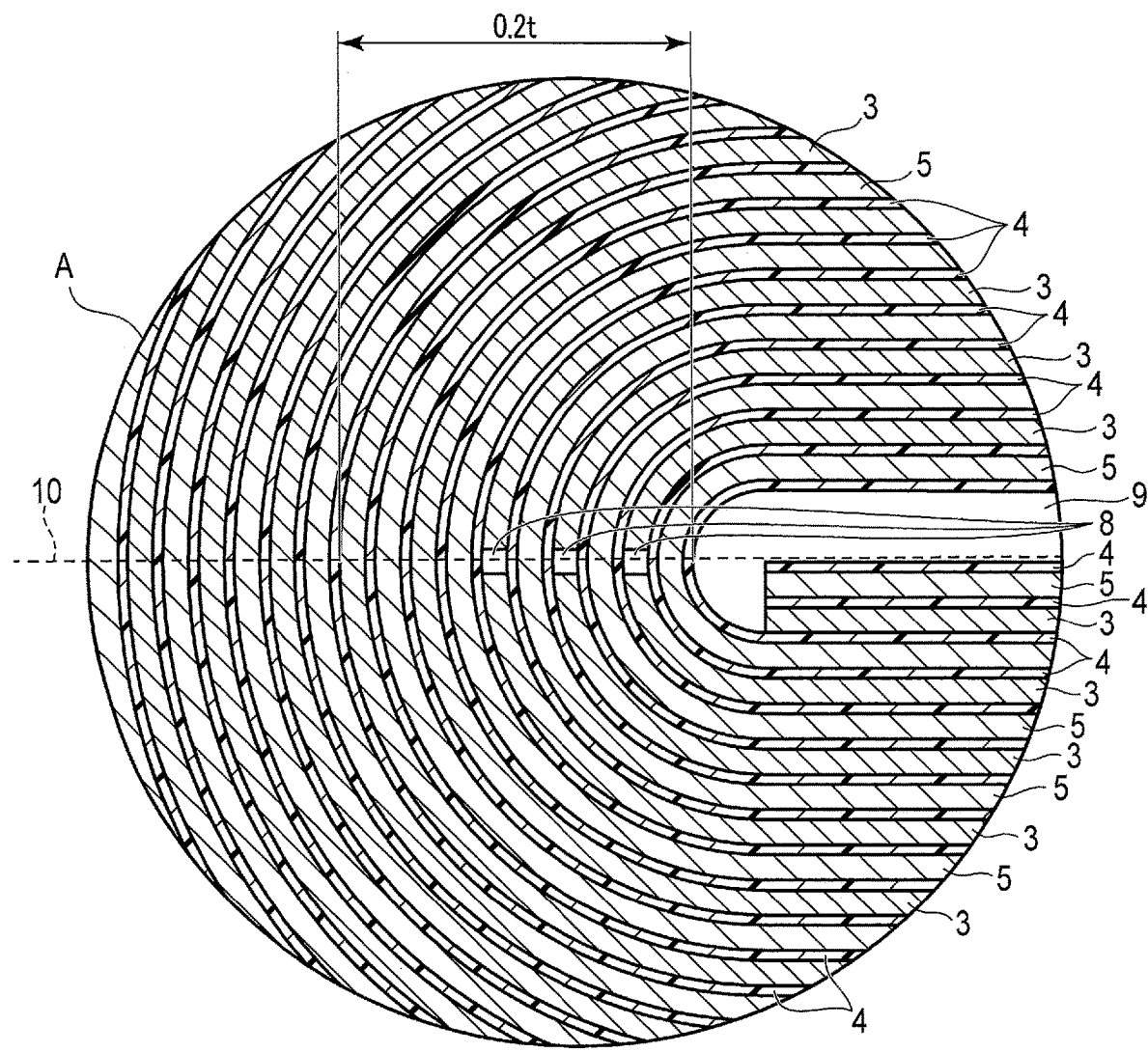
FIG. 3 is an enlarged cross-sectional view of section A of the electrode group shown in FIG. 3.

With reference to FIGS. 1 to 3, the electrode group according to the embodiment will be described. FIG. 1 is a perspective view schematically showing an example of the electrode group according to the embodiment. FIG. 2 is a schematic cross-sectional view taken along virtual plane II shown in FIG. 1. FIG. 3 is an enlarged cross-sectional view of section A of the electrode group shown in FIG. 2.

Electrode group 1 shown in FIG. 1 has a wound structure of flat shape in which the electrode group is wound around a virtual winding axis C along a first direction 11. Furthermore, the wound structure is, as shown in FIGS. 2 and 3, a structure where a stack including the negative electrode 3, a positive electrode 5, and a separator 4 provided between the negative electrode 3 and the positive electrode 5 is wound in a flat shape. Each of the negative electrode 3, the positive electrode 5, and the separator 4 are wound several times and are arranged repeatedly inside the electrode group 1 in the order of negative electrode 3, separator 4, positive electrode 5, separator 4, negative electrode 3, separator 4, positive electrode 5, and separator 4. A space 9 is present around the winding axis C.

FIG. 2 shows a winding cross-section of the electrode group 1 orthogonal to the first direction 11. Dashed line 10 shown in FIG. 2 indicates a position along which the longest straight line from one end to the other end of the electrode group 1 lies in this winding cross section. The electrode group 1 includes curved sections 13 at both ends along a second direction 12 parallel to the longest straight line and a flat section 14 between the curved sections 13. In each of the curved sections 13, the negative electrode 3, separator 4, and positive electrode 5 are bent into a curved shape. In the flat section 14, the negative electrode 3, separator 4, and positive electrode 5 are flat or substantially flat.

A distance from an innermost lap 15 to an outermost lap 16 in a curved section 13 of the electrode group 1, where the negative electrode 3, separator 4, and positive electrode 5 are curved, is defined as a thickness t of a wall of the electrode group 1 surrounding a space 9. Specifically, the thickness t refers to a thickness along the longest straight line described above. The thickness t may be a thickness of a stack including the negative electrode 3, separator 4, and positive electrode 5, in a stacking direction before the stack is wound. In a section ranging over a thickness of 0.2 t from the innermost lap 15 toward the outermost lap 16 along the longest straight line in the wound cross-section of the electrode group 1, a part of the portion of the negative electrode 3 positioned in this section includes slits 8. Namely, in the arc-shaped curved section 13 of the wall of the electrode group 1, the negative electrode 3 includes the slits 8 in a region of up to one fifth of the wall thickness from the innermost lap side. Although FIG. 3 shows only one section, slits 8 are present in each of the sections ranging over a thickness of 0.2 t from the innermost lap 15 toward the outer periphery in each of the arc-shaped curved sections 13 at both ends of the electrode group 1 along the second direction 12.

In a flat section 14, where the negative electrode 3, the separator 4, and the positive electrode 5 are flat (or substantially flat), the surfaces of the respective members are apt to come into close contact with each other. Therefore, in the flat section 14 positioned in the center along the second direction, a charge-discharge reaction can proceed smoothly between the negative electrode 3 and the positive electrode 5. In contrast, in the curved sections 13 configured of the curved negative electrode 3, separator 4 and positive electrode 5, contact between the respective members tends to be poor. Therefore, it is more difficult for a charge-discharge reaction to proceed in the curved section 13 than in the flat section 14. A charge-discharge reaction is more difficult to proceed on the innermost lap 15 side than on the outermost lap 16 side, and the reaction becomes more difficult to proceed as the position becomes closer to the innermost periphery 15 side. Because of this, the battery resistance may increase locally in an electrode group not including the slit 8 at the aforementioned position.

In the electrode group 1 having the slits 8 in the negative electrode 3 in the section ranging over a thickness of 0.2 t from the innermost lap 15 toward the outer periphery along the longest straight line in the wound cross-section, namely, in vicinity of the innermost lap 15 in the curved section 13, as in the illustrated example, a local increase in the resistance can be suppressed. With the slits 8 provided, the stress or rigidity in the portions of the negative electrode 3 adjacent to the slits 8 is alleviated, and the portions are more likely to be in close contact with the positive electrode 5 with the separator 4 interposed therebetween. Namely, by including the slits 8, the portions where a charge-discharge reaction is difficult to proceed can be reduced in the curved sections 13.

The term "slit" used herein refers to a notch and/or a cut portion in the negative electrode. The "cut portion" may refer to, for example, a portion made by cutting a part of the negative electrode by a method described later. The notch or cut portion is provided in a part of the negative electrode 3 along a first direction 11 of the electrode group 1. As will be described later, the negative electrode 3 may include a negative electrode current collector and a negative electrode active material-containing layer provided on the negative electrode current collector. The slit 8 indicates a notch and/or a cut portion ranging over the entire thickness direction of the negative electrode 3 including the negative electrode current collector and the negative electrode active material-containing layer. Namely, in the position where the slit 8 is present, a notch and/or a cut portion is/are provided in both the negative electrode current collector and the negative electrode active material-containing layer.

Among the multiple laps of winding included in the negative electrode 3, the slit 8 may exist in one or more laps positioned within a thickness of 0.2 t from the innermost lap 15 toward the outside. Slits 8 may be provided in all of the laps from the innermost lap 15 to a thickness of 0.2 t, or the slits 8 may be provided in a part of the laps. When the slit (B) 8 is (are) provided in part of the laps of winding of the negative electrode 3 at a position up to a thickness of 0.2 t, the position (s) of the slit (s) 8 is (are) not particularly limited as long as the position(s) falls within a thickness range of up to 0.2 t. For example, the position(s) of the slit (s) 8 may be biased towards the innermost lap 15 side. Alternatively, the position(s) of the slit(s) 8 may be biased toward the outermost periphery within the thickness range of up to 0.2 t. In addition, the slits 8 may be provided in adjacent laps among the laps of winding of the negative electrode 3, buy the laps where the slits 8 are provided need not be adjacent to each other. The position(s) of the slit(s) 8 preferably concentrates toward the innermost periphery 15 side.

In the electrode group 1, the portion outside a range of a thickness of 0.2 t from the innermost periphery 15 does not include the slit 8. Namely, a region other than the portion up to a thickness of 0.2 t from the innermost periphery 15 toward the outermost periphery 16 does not have an incision or a cut portion. Even within the curved section 13, a charge-discharge reaction is performed relatively smoothly in a section closer to the outermost lap 16, and the effect achieved by providing the slit 8 becomes smaller as the outermost lap 16 is approached. Making a cut in a section contributing to charge and discharge is equivalent to shutting off an electron conduction path. By limiting the range of providing the slit 8 within a thickness of 0.2 t, it is possible to achieve the above-described effect while suppressing degradation of the battery performance.

As shown by the arrangement along the dashed line 10 in FIG. 3, the positions of the slits 8 may overlap with the longest straight line in the wound cross-section. The positions of the slits 8 need not overlap with the longest straight line. The slit (s) 8 is (are) positioned in the portion of the negative electrode 3 that is included within a section of up to a thickness of 0.2 t from the innermost periphery 15 toward the outer side along the longest straight line, and also positioned along the longest straight line. In other words, the slit (s) 8 is (are) positioned within a portion accounting for the innermost 20% of the number of windings of the negative electrode 3, and moreover, positioned at a portion included in the curved section 13 among that innermost portion. It is desirable for the position of the slit (s) 8 be at least adjacent to the longest straight line in the wound cross-section. Namely, it is desirable for the position of the slit(s) 8 be adjacent to and/or overlap with the longest straight line. More preferably, the position of the slit(s) 8 overlaps with the longest straight line in the wound cross-section.

The slit 8 provided in the negative electrode 3 may span over an entire first length $L_A$ of the electrode group in the first direction 11, or span in a part of the first length $L_A$. For example, the negative electrode current collector that can be included in the negative electrode 3 may include a portion that is not provided with the negative electrode active material-containing layer and can function as a negative electrode current-collecting tab, as described later; the slit 8 may range over the entire negative electrode 3 along the first direction 11 excluding the negative electrode current-collecting tab. The length of the slit 8 along the first direction 11 is preferably in the range of 0.3 $L_A$ to 0.8 $L_A$ with respect to the first length $L_A$.

When the electrode group 1 includes plural slits 8, the lengths of the respective slits 8 along the first direction 11 may be the same or different. When the number of slits 8 is plural, the length of the slit 8 as mentioned herein refers to an average length of the slits 8. The slit 8 along the first direction 11 need not be continuous, and may include plural notches and/or cut portions that are separated from each other along the first direction 11. In regard to the portion of the negative electrode 3 where the slit 8 is divided into plural notches and/or cut portions along the first direction 11, the total of the lengths of the respective notches and/or cut portions in the first direction 11 is regarded as the length of the slit 8. Namely, an average of the total length of the respective slits 8 is preferably within the range of 0.3 $L_A$ to 0.8 $L_A$ with respect to the first length $L_A$. More preferably, for all of the slits 8, the total length of the respective slits is within the range of 0.3 $L_A$ to 0.8 $L_A$ with respect to the first length $L_A$.

The effect achieved by providing the slit 8 in the innermost portion of the negative electrode 3 within a thickness of 0.2 t is favorably exhibited in the electrode group 1 in which the first length $L_A$ in the first direction 11 and a second length $L_B$ in the second direction 12 satisfy a relationship of $1<L_A/L_B<5$. A ratio of the first length $L_A$ to the second length $L_B$ being large means that a proportion of the curved section 13 with respect to the flat section 14 is relatively large. Also, the longer the first length $L_A$, the longer the distance in which a liquid electrolyte permeates from an end face crossing the first direction 11 to the inside of the electrode group, whereby there is increase in the sections within the electrode group that is short of an electrolyte. Therefore, among typical electrode groups, those with a longer first length $L_A$ in the first direction 11 is more likely to undergo a local increase in the resistance than those with a short first length $L_A$. In the electrode group 1 according to the embodiment, since the slit 8 is provided in the above-described position, a local increase in the resistance can be suppressed even when the first length $L_A$ is relatively long. An electrode group 1 in which a ratio of the first length $L_A$ to the second length $L_B$ is less than 5 can achieve larger effects by being provided with the slit 8. The second direction 12 is orthogonal to the first direction 11.

Hereinafter, the negative electrode, the positive electrode, the electrolyte, the separator, the container member, the negative electrode terminal, and the positive electrode terminal will be described in detail.

1) Negative Electrode

The negative electrode includes a negative electrode current collector and a negative electrode active material-containing layer. The negative electrode active material-containing layer may be formed on one surface or both of reverse surfaces of the negative electrode current collector. The negative electrode active material-containing layer includes a negative electrode active material, and may optionally include an electro-conductive agent and a binder.

The negative electrode active material-containing layer includes a titanium-containing oxide as a negative electrode active material. Examples of titanium-containing oxides include lithium titanate having a ramsdellite structure (e.g., $Li_{2+w}Ti_3O_7$, $0 \le w \le 3$), lithium titanate having a spinel structure (e.g., $Li_{4+w}Ti_5O_{12}$, $0 \le w \le 3$), monoclinic titanium dioxide ($TiO_2$), anatase titanium dioxide, rutile titanium dioxide, a hollandite titanium composite oxide, an orthorhombic titanium composite oxide, and monoclinic niobium-titanium composite oxide.

Examples of the orthorhombic titanium-containing composite oxide include a compound represented by $Li_{2+a}M\alpha_{2-b}Ti_{6-c}M\beta_dO_{14+\sigma}$. Here, Mα is at least one selected from the group consisting of Sr, Ba, Ca, Mg, Na, Cs, Rb and K. Mβ is at least one selected from the group consisting of Zr, Sn, V, Nb, Ta, Mo, W, Y, Fe, Co, Cr, Mn, Ni and Al. The respective subscripts in the composition formula are specified as follows: $0 \le a \le 6$, $0 \le b < 2$, $0 \le c < 6$, $0 \le d < 6$, and $-0.5 \le \sigma \le 0.5$.

A specific example of the orthorhombic titanium-containing composite oxide includes an orthorhombic sodium-containing titanium-containing oxide represented by $Li_{2+a}Na_{2-y}MA_yTi_{6-z}MBzO_{14}$. Here, MA is at least one selected from the group consisting of Sr, Ba, K, and Cs. MB is at least one selected from the group consisting of Nb, Ta, Zr and Mo. In the compositional formula, the respective subscripts are $0 \leq a \leq 6$, $0 \leq y < 1$, $0 \leq z < 2$. A more specific example includes $Li_{2+a}Na_2Ti_6O_{14}$ ($0 \leq a \leq 6$).

An example of the monoclinic niobium-titanium composite oxide is a compound represented by $Li_xTi_{1-y}M1_{y+z}Nb_{2-z}O_{7-\delta}$. Here, M1 is at least one selected from the group consisting of Mg, Fe, Ni, Co, W, Ta, and Mo. The respective subscripts in the composition formula are specified as follows: $0 \leq x \leq 5$, $0 \leq y < 1$, $0 \leq z < 2$, and $-0.3 \leq \delta \leq 0.3$. A specific example of the monoclinic niobium-titanium composite oxide includes $Li_xNb_2TiO_7$ ($0 \leq x \leq 5$).

Another example of the monoclinic niobium-titanium composite oxide includes a compound represented by $Li_xTi_{1-y}M2_yNb_{2-z}M3_zO_{7+\delta}$. Here, M2 is at least one selected from the group consisting of Zr, Si, and Sn. M3 is at least one selected from the group consisting of V, Ta, and Bi. The respective subscripts in the composition formula are specified as follows: $0 \leq x \leq 5$, $0 \leq y < 1$, $0 \leq z < 2$, and $-0.3 \leq \delta \leq 0.3$.

Among the above titanium-containing oxides, the orthorhombic titanium-containing composite oxide, particularly the orthorhombic sodium-containing titanium-containing oxide is preferably included as a negative electrode active material from the standpoint of achieving a high battery voltage. From the standpoint of achieving a high capacity, the monoclinic niobium titanium composite oxide is preferably included as a negative electrode active material.

In addition to the above titanium-containing oxides, a niobium oxide such as niobium pentoxide may be included as a negative electrode active material.

The electro-conductive agent is blended in order to enhance the current collecting performance and to suppress contact resistance between the negative electrode active material and the negative electrode current collector.

Examples of the electro-conductive agent include carbonaceous substances such as vapor grown carbon fiber (VGCF), carbon blacks such as acetylene black, graphite, carbon nanofibers, and carbon nanotubes. One of these may be used as the electro-conductive agent, or two or more may be used in combination as the electro-conductive agent. Alternatively, instead of using the electro-conductive agent, a carbon coating or an electro-conductive inorganic material coating may be applied to the surface of the active material particle.

The binder is added to fill gaps among the dispersed active material and also to bind the negative electrode active material with the negative electrode current collector.

Examples of the binder include polytetrafluoroethylene (PTFE), polyvinylidene fluoride (PVdF), polyvinyl pyrrolidone (PVP), fluororubber, styrene-butadiene rubber, acrylic resin, copolymers of acrylic resin, polyacrylate compounds, imide compounds, carboxymethyl cellulose (CMC), and salts of CMC.

Examples of copolymers of acrylic resin and polyacrylate compounds include polyacrylic acid and polyacrylonitrile. One of these may be used as the binder, or alternatively, two or more may be used in combination as the binder.

In the negative electrode active material-containing layer, the negative electrode active material, electro-conductive agent, and binder are preferably blended in proportions of 70% by mass to 96% by mass, 2% by mass to 28% by mass, and 2% by mass to 28% by mass, respectively. When the amount of electro-conductive agent is 2% by mass or more, the current collection performance of the negative electrode active material-containing layer can be improved whereby the output performance of the secondary battery including the electrode group can be improved. When the amount of binder is 2% by mass or more, binding between the negative electrode active material-containing layer and negative electrode current collector is sufficient, and excellent cycling performances can be expected. On the other hand, an amount of each of the electro-conductive agent and binder is preferably 28% by mass, in view of increasing the capacity.

There may be used for the negative electrode current collector, a material which is electrochemically stable at the potential at a potential higher than 0.8 V (vs. Li/Li$^+$) with respect to the oxidation-reduction potential of lithium, for example, within a potential range of from 1V to 3 V (vs. Li/Li$^+$) with respect to the oxidation-reduction potential of lithium.

For example, the negative electrode current collector is preferably made of aluminum or an aluminum alloy including one or more selected from the group consisting of Mg, Ti, Zn, Mn, Fe, Cu, and Si. The thickness of the current collector is preferably from 5 μm to 20 μm. The current collector having such a thickness can maintain balance between the strength and weight reduction of the electrode.

The negative electrode current collector may include a portion, where the negative electrode active material-containing layer is not formed on a surface thereof. This portion may serve as a negative electrode current collecting tab.

It is preferable for the negative electrode active material-containing layer (excluding the current collector) to have a density of 2.1 g/cm$^3$ to 2.8 g/cm$^3$. A negative electrode having a density of the negative electrode active material-containing layer within this range is excellent in energy density and ability to hold the electrolyte.

2) Positive Electrode

The positive electrode may include a positive electrode current collector and a positive electrode active material-containing layer. The positive electrode active material-containing layer may be formed on one surface or both of reverse surfaces of the positive electrode current collector. The positive electrode active material-containing layer may include a positive electrode active material, and optionally an electro-conductive agent and a binder.

As the positive electrode active material, for example, an oxide or a sulfide may be used. The positive electrode may singly include one species of compound as the positive electrode active material, or alternatively, include two or more species of compounds in combination. Examples of the oxide and sulfide include compounds capable of having Li and Li ions be inserted and extracted.

Examples of such compounds include manganese dioxides ($MnO_2$), iron oxides, copper oxides, nickel oxides, lithium manganese composite oxides (e.g., $Li_pMn_2O_4$ or $Li_pMnO_2$; $0<p \leq 1$), lithium nickel composite oxides (e.g., $Li_pNiO_2$; $0<p \leq 1$), lithium cobalt composite oxides (e.g., $Li_pCoO_2$; $0<p \leq 1$), lithium nickel cobalt composite oxides (e.g., $Li_pNi_{1-q}Co_qO_2$; $0<p \leq 1$, $0<q<1$), lithium manganese cobalt composite oxides (e.g., $Li_pMn_qCo_{1-q}O_2$; $0<p \leq 1$, $0<q<1$), lithium manganese nickel composite oxides having a spinel structure (e.g., $Li_pMn_{2-s}Ni_sO_4$; $0<p \leq 1$, $0<s<2$), lithium phosphates having an olivine structure (e.g., $Li_pFePO_4$; $0<p \leq 1$, $Li_pFe_{1-t}Mn_tPO_4$; $0<p \leq 1$, $0<t \leq 1$, $Li_pCoPO_4$; $0<p \leq 1$), iron sulfates ($Fe_2(SO_4)_3$), vanadium oxides (e.g., $V_2O_5$), and lithium nickel cobalt manganese composite oxide (e.g., $Li_pNi_{1-q-r}Co_qMn_rO_2$; $0<p \leq 1$, $0<q<1$, $0<r<1$, $q+r<1$).

Among the above, examples of compounds more preferable as the positive electrode active material include lithium manganese composite oxides having a spinel structure (e.g., $Li_pMn_2O_4$; $0<p \leq 1$), lithium nickel composite oxides (e.g., $Li_pNiO_2$; $0<p \leq 1$), lithium cobalt composite oxides (e.g., $Li_pCoO_2$; $0<p \leq 1$), lithium nickel cobalt composite oxides (e.g., $Li_pNi_{1-q}Co_qO_2$; $0<p \leq 1$, $0<q<1$), lithium manganese nickel composite oxides having a spinel structure (e.g., $Li_pMn_{2-s}Ni_sO_4$; $0<p\leq1$, $0<s<2$), lithium manganese cobalt composite oxides (e.g., $Li_pMn_qCo_{1-q}O_2$; $0<p\leq1$, $0<q<1$), lithium phosphates having an olivine structure (e.g., $Li_pFePO_4$; $0<p\leq1$, $Li_pFe_{1-t}Mn_tPO_4$; $0<p\leq1$, $0<t\leq1$, $Li_pCoPO_4$; $0<p\leq1$), and lithium nickel cobalt manganese composite oxides ($Li_pNi_{1-q-r}Co_qMn_rO_2$; $0<p\leq1$, $0<q<1$, $0<r<1$, $q+r<1$). The positive electrode potential can be made high by using these positive electrode active materials.

When an ambient temperature molten salt is used as the electrolyte of the battery, it is preferable to use a positive electrode active material including lithium iron phosphate, $Li_uVPO_4F$ ($0\leq u\leq1$), lithium manganese composite oxide, lithium nickel composite oxide, lithium nickel cobalt composite oxide, or a mixture thereof. Since these compounds have low reactivity with ambient temperature molten salts, cycle life can be improved. Details regarding the ambient temperature molten salt are described later.

The primary particle diameter of the positive electrode active material is preferably from 100 nm to 1 μm. The positive electrode active material having a primary particle size of 100 nm or more is easy to handle during industrial production. In the positive electrode active material having a primary particle size of 1 μm or less, in-solid diffusion of lithium ions can proceed smoothly.

The specific surface area of the positive electrode active material is preferably from 0.1 m²/g to 10 m²/g. The positive electrode active material having a specific surface area of 0.1 m²/g or more can secure sufficient sites for inserting and extracting Li ions. The positive electrode active material having a specific surface area of 10 m²/g or less is easy to handle during industrial production, and can secure a good charge-discharge cycle performance.

The binder is added to fill gaps among the dispersed positive electrode active material and also to bind the positive electrode active material with the positive electrode current collector. Examples of the binder include polytetrafluoroethylene (PTFE), polyvinylidene fluoride (PVdF), fluororubber, acrylic resin, copolymers of acrylic resin, polyacrylate compounds, imide compounds, carboxymethyl cellulose (CMC), and salts of CMC. Examples of copolymers of acrylic resin and polyacrylate compounds include polyacrylic acid and polyacrylonitrile. One of these may be used as the binder, or alternatively, two or more may be used in combination as the binder.

The electro-conductive agent is added to improve current collection performance and to suppress the contact resistance between the positive electrode active material and the positive electrode current collector. Examples of electro-conductive agent include carbonaceous substances such as vapor grown carbon fiber (VGCF), carbon blacks such as acetylene black, graphite, carbon nanofibers, and carbon nanotubes. One of these may be used as the electro-conductive agent, or two or more may be used in combination as the electro-conductive agent. The electro-conductive agent may be omitted.

In the positive electrode active material-containing layer, the positive electrode active material and binder are preferably blended in proportions of 80% by mass to 98% by mass, and 2% by mass to 20% by mass, respectively.

When the amount of the binder is 2% by mass or more, sufficient electrode strength can be achieved. The binder may serve as an electrical insulator. Thus, when the amount of the binder is 20% by mass or less, the amount of insulator in the electrode is reduced, and thereby the internal resistance can be decreased.

When an electro-conductive agent is added, the positive electrode active material, binder, and electro-conductive agent are preferably blended in proportions of 80% by mass to 95% by mass, 2% by mass to 17% by mass, and 3% by mass to 18% by mass, respectively.

When the amount of the electro-conductive agent is 3% by mass or more, the above-described effects can be expressed. By setting the amount of the electro-conductive agent to 18% by mass or less, the proportion of electro-conductive agent that contacts the electrolyte can be made low. When this proportion is low, decomposition of electrolyte can be reduced during storage under high temperatures.

The positive electrode current collector is preferably an aluminum foil, or an aluminum alloy foil containing one or more selected from the group consisting of Mg, Ti, Zn, Ni, Cr, Mn, Fe, Cu, and Si.

The thickness of the aluminum foil or aluminum alloy foil is preferably from 5 μm to 20 μm, and more preferably 15 μm or less. The purity of the aluminum foil is preferably 99% by mass or more. The amount of transition metal such as iron, copper, nickel, or chromium contained in the aluminum foil or aluminum alloy foil is preferably 1% by mass or less.

The positive electrode current collector may include a portion where a positive electrode active material-containing layer is not formed on a surface of thereof. This portion may serve as a positive electrode current collecting tab.

3) Separator

The separator may be made of, for example, a porous film or synthetic resin nonwoven fabric including polyethylene (PE), polypropylene (PP), cellulose, or polyvinylidene fluoride (PVdF). In view of safety, a porous film made of polyethylene or polypropylene is preferred. This is because such a porous film melts at a fixed temperature and thus able to shut off current. Further, a separator obtained by applying an inorganic compound onto a porous film may also be used.

<Method of Producing Electrode Group>

The electrode group may be produced as follows, for example.

A negative electrode, positive electrode, and separator are prepared.

The negative electrode may be fabricated by the following method, for example. First, negative electrode active material, electro-conductive agent, and binder are suspended in a solvent to prepare a slurry. The slurry is applied onto one surface or both of reverse surfaces of a negative electrode current collector. Next, the applied slurry is dried to form a composite (stack) of the negative electrode active material-containing layer and negative electrode current collector. Then, the composite is subjected to pressing. The negative electrode can be fabricated in this manner.

The positive electrode can be fabricated by the same method as the negative electrode, using the positive electrode active material in place of the negative electrode active material, and the positive electrode current collector in place of the negative electrode current collector, for example.

The prepared negative electrode, separator, and positive electrode are stacked in the order of the negative electrode, separator, positive electrode, and separator, to obtain a stack. Then, the stack is spirally wound to obtain a wound body. Hereupon, the stack may be wound, for example, such that a part of the negative electrode would be the outermost periphery. The wound body thus obtained is pressed, whereby a wound electrode group having a flat shape can be obtained.

By using an appropriately designed negative electrode and pressing the wound body under appropriate conditions, the negative electrode can be cut in the above-described portion within a thickness of 0.2 t from the innermost lap, to provide the slit(s). By appropriately adjusting the design of the negative electrode and the pressing conditions for the wound body, it is possible to control the number of rounds of winding of the negative electrode in which a slit is made, namely, the range in which slits are provided in the thickness direction from the innermost lap to the outermost lap of the electrode group.

For example, in an electrode group that uses a negative electrode including a copper foil as a negative electrode current collector and including a carbon material as a negative electrode active material, it is difficult to generate a slit in the negative electrode in the curved section. When a less flexible negative electrode is used, a slit is more easily generated. Specifically, the hardness of the negative electrode increases in tandem with an increase in the amount of the electro-conductive agent and an increase in the amount of the binder contained in the negative electrode active material-containing layer, and the number of rounds of winding including a slit tends to increase in tandem with the increase in the hardness of the negative electrode. When a blending proportion of the binder is increased, the negative electrode is easily cut also because the strength of the binding between the negative electrode active material-containing layer and the negative electrode current collector is increased, whereby stress is apt to concentrate on the portion that is bent when the wound body is pressed. The hardness of the negative electrode is also affected by the composition or particle form of the negative electrode active material. The higher the density of the negative electrode active material-containing layer, the greater the number of laps having a slit tends to be, and the smaller the particle size of the negative electrode active material particles, the greater the number of laps having a slit tends to be. The density of the negative electrode active material-containing layer can be controlled by, for example, adjusting the amount of slurry applied onto the current collector and the conditions of pressing the composite of the negative electrode active material-containing layer and the negative electrode current collector.

From the standpoint of cutting the negative electrode by pressing the wound body, as well, an aluminum foil or an aluminum alloy foil is preferably used as the negative electrode current collector. When a thin negative electrode current collector is used, the number of rounds of winding having a slit tends to increase.

When pressing the wound body, a load of 80 kN is applied to the wound body for one to three minutes, for example. By setting the load applied at the time of pressing to a specific value or more, it can be expected that a slit be generated in the negative electrode along the first direction. The longer the pressing time, the greater the number of rounds of winding including a slit tends to be. Hot pressing may be performed, in which case the number of rounds of winding including the slit generated in the negative electrode tends to increase.

It is not preferable to provide a notch or a cut portion in the negative electrode in advance before the stack including the negative electrode, separator, and positive electrode is wound, although it does not interfere with the present invention. If a notch is provided in the negative electrode or the negative electrode is cut before the stack is wound, not only is the workability during winding hindered, but also the adhesion between the members may degrade in the resultant electrode group. This may rather cause an increase in the battery resistance.

<Measuring Methods>

Various measuring methods for the electrode group will be described below. Specifically, a method of examining a slit of the negative electrode included in the innermost portion in the curved section of the electrode group, and a method of examining the negative electrode active material included in the negative electrode will be described.

In such a case where the electrode group to be measured is assembled inside a secondary battery, the electrode group is taken out as follows. First, the battery is brought into a discharged state. The discharged state as described herein indicates a state in which the battery is discharged at a constant current of 0.2 C or less to the discharge lower limit voltage in an environment of 25° C. The battery brought to the discharged state is placed in a glove box of an inert atmosphere, e.g., a glove box filled with argon gas. Next, the battery is disassembled in the glove box, and the electrode group is taken out from the battery. Specifically, inside the glove box, the battery is opened by cutting the exterior of the battery while paying attention as a precaution so as to avoid short-circuiting the positive and negative electrodes. The electrode group is taken out therefrom, and its surface is washed with, for example, methyl ethyl carbonate (MEC) solvent. By the washing, Li salt adhered to the surface of the electrode group is removed. Thereafter, the electrode group is dried.

Washing of the electrode group may be omitted. However, for the electrode for which the active material is examined, the electrode is washed after taking the electrode out from the electrode group as described later.

(Method of Examining Slit)

Whether or not there is a slit (notch and/or cut portion) of the negative electrode in the section within a thickness of 0.2 t from the innermost lap in the electrode group can be examined by a method described below.

In the wound electrode group, the number of rounds of winding of the stack of the negative electrode, positive electrode, and separator included in the electrode group is examined. The number of rounds of winding accounting for 20% or less of the total number of rounds of winding of the electrode group is counted from the innermost lap, and it is examined whether a part of the negative electrode has a notch or a cut portion along the first direction at a position along the longest straight line in the wound cross-section within the rounds of winding accounting for 20% or less from the innermost lap. Based on the total number of windings of the electrode group and the thickness (t) of the stack, the number of rounds (laps) in which a notch and/or a cut portion is/are confirmed can be converted into units in terms of the thickness t. Herein, the notch or cut portion refers to a portion where there is a notch or a cut portion in the negative electrode active material-containing layer and the current collector, and does not refer to a portion where only the negative electrode active material-containing layer is lacking thereby making the current collector exposed. For example, when the number of windings of the electrode group is 50, rounds of winding within 10 laps from the innermost lap are examined as to whether the negative electrodes therein have a notch or a cut portion.

(Method of Examining Negative Electrode Active Material)

The negative electrode is taken out from the electrode group, to thereby obtain a sample for measurement. For example, the electrode connected to a negative electrode-side terminal is cut out. The taken-out electrode is washed with, for example, methyl ethyl carbonate (MEC) solvent.

By the washing, Li salt adhered to the electrode surface is removed, and thereafter, the electrode is dried.

Using the obtained electrode (negative electrode) obtained as a sample, the composition of active material included in the electrode, for example, in the active material-containing layer, can be examined by combining elemental analysis with a scanning electron microscope equipped with an energy dispersive X-ray spectrometry scanning apparatus (scanning electron microscope-energy dispersive X-ray spectrometry; SEM-EDX), X-ray diffraction (XRD) measurement, and inductively coupled plasma (ICP) emission spectrometry. By SEM-EDX analysis, shapes of components contained in the active material-containing layer and compositions of the components contained in the active material-containing layer (each element from B to U in the periodic table) can be known. Elements within the active material-containing layer can be quantified by ICP measurement. Crystal structures of materials included in the active material-containing layer can be examined by XRD measurement.

A cross-section of the electrode taken out as described above is cut out by Ar ion milling. The cut out cross-section is observed with the SEM. Sampling is also performed in an inert atmosphere such as argon or nitrogen to avoid exposure to the air. Several particles are selected from SEM images at 3000-fold magnification. Here, particles are selected such that a particle diameter distribution of the selected particles becomes as wide as possible.

Next, elemental analysis is performed on each selected particle by EDX. Accordingly, it is possible to specify kinds and quantities of elements other than Li among the elements contained in each selected particle.

With regard to Li, information regarding the Li content in the entire active material can be obtained by ICP emission spectrometry. ICP emission spectrometry is performed according to the following procedure.

From the dried electrode, a powder sample is prepared in the following manner. The active material-containing layer is dislodged from the current collector and ground in a mortar. The ground sample is dissolved with acid to prepare a liquid sample. Here, hydrochloric acid, nitric acid, sulfuric acid, hydrogen fluoride, and the like may be used as the acid. The concentration of elements included in the active material being measured can be found by subjecting the liquid sample to ICP analysis.

Crystal structure (s) of compound (s) included in each of the particles selected by SEM can be specified by XRD measurement. XRD measurement is performed within a measurement range where 2θ is from 5 degrees to 90 degrees, using CuKα ray as a radiation source. By this measurement, X-ray diffraction patterns of compounds contained in the selected particles can be obtained.

As an apparatus for XRD measurement, SmartLab manufactured by Rigaku is used, for example. Measurement is performed under the following conditions:
X ray source: Cu target
Output: 45 kV, 200 mA
soller slit: 5 degrees in both incident light and received light
step width (2θ): 0.02 deg
scan speed: 20 deg/min
semiconductor detector: D/teX Ultra 250
sample plate holder: flat glass sample plate holder (0.5 mm thick)
measurement range: range of 5°≤2θ≤90°
When another apparatus is used, measurement using a standard Si powder for powder X-ray diffraction is performed to seek conditions at which measurement results of peak intensities, half-widths, and diffraction angles are equivalent to results obtained by the above apparatus, and measurement is conducted at those conditions.

Conditions of the XRD measurement is set, such that an XRD pattern applicable to Rietveld analysis is obtained. In order to collect data for Rietveld analysis, specifically, the step width is made ⅓ to ⅕ of the minimum half width of the diffraction peaks, and the measurement time or X-ray intensity is appropriately adjusted in such a manner that the intensity at the peak position of strongest reflected intensity is 5,000 cps or more.

The XRD pattern obtained as described above is analyzed by the Rietveld method. In the Rietveld method, the diffraction pattern is calculated from the crystal structure model that has been estimated in advance. Here, estimation of the crystal structure model is performed based on analysis results of EDX and ICP. The parameters of the crystal structure (lattice constant, atomic coordinate, occupancy ratio, or the like) can be precisely analyzed by fitting all the calculated values with the measured values.

XRD measurement can be performed with the electrode sample directly attached onto a glass holder of a wide-angle X-ray diffraction apparatus. At this time, an XRD spectrum is measured in advance in accordance with the species of metal foil of the electrode current collector, and the position(s) of appearance of the peak(s) derived from the collector is grasped. In addition, the presence/absence of peak (s) of mixed substances such as an electro-conductive agent or a binder is also grasped in advance. If the peak (s) of the current collector overlaps the peak (s) of the active material, it is desirable to perform measurement with the active material-containing layer removed from the current collector. This is in order to separate the overlapping peaks when quantitatively measuring the peak intensities. If the overlapping peaks has been grasped beforehand, the above operations can be omitted, of course.

The electrode group according to the first embodiment includes a positive electrode and a negative electrode including a titanium-containing oxide, and has a flat-shaped wound structure formed of a stack including the positive electrode and the negative electrode being wound. At a position within a thickness of 0.2 t from an innermost lap to an outermost lap along a longest straight line in a wound cross-section of the wound structure orthogonal to a first direction along a winding center of the flat wound structure, at least part of the negative electrode has a slit lying along the first direction. Electrical resistance is suppressed in the electrode group, and therefore, the electrode group can provide a secondary battery excellent in output performance.

Second Embodiment

According to a second embodiment, provided is a secondary battery including an electrode group and an electrolyte. The electrode included in the secondary battery is the electrode according to the first embodiment. The electrolyte may be held in the electrode group.

The secondary battery according to the second embodiment may further include a container member that houses the electrode group and the electrolyte.

Furthermore, the secondary battery according to the second embodiment may further include a negative electrode terminal electrically connected to the negative electrode and a positive electrode terminal electrically connected to the positive electrode.

The secondary battery according to the second embodiment may be, for example, a lithium secondary battery. Moreover, the secondary battery includes a nonaqueous electrolyte secondary battery including a nonaqueous electrolyte.

Hereinafter, the electrolyte, the container member, the negative electrode terminal, and the positive electrode terminal will be described in detail.

I. Electrolyte

As the electrolyte, for example, a liquid nonaqueous electrolyte or gel nonaqueous electrolyte may be used. The liquid nonaqueous electrolyte is prepared by dissolving an electrolyte salt as solute in an organic solvent. The concentration of electrolyte salt is preferably from 0.5 mol/L to 2.5 mol/L.

Examples of the electrolyte salt include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), and lithium bistrifluoromethylsulfonylimide [$LiN(CF_3SO_2)_2$], and mixtures thereof. The electrolyte salt is preferably resistant to oxidation even at a high potential, and most preferably $LiPF_6$.

Examples of the organic solvent include cyclic carbonates such as propylene carbonate (PC), ethylene carbonate (EC), and vinylene carbonate (VC); linear carbonates such as diethyl carbonate (DEC), dimethyl carbonate (DMC), and methyl ethyl carbonate (MEC); cyclic ethers such as tetrahydrofuran (THF), 2-methyl tetrahydrofuran (2-MeTHF), and dioxolane (DOX); linear ethers such as dimethoxy ethane (DME) and diethoxy ethane (DEE); γ-butyrolactone (GBL), acetonitrile (AN), and sulfolane (SL). These organic solvents may be used singularly or as a mixed solvent.

The gel nonaqueous electrolyte is prepared by obtaining a composite of a liquid nonaqueous electrolyte and a polymeric material. Examples of the polymeric material include polyvinylidene fluoride (PVdF), polyacrylonitrile (PAN), polyethylene oxide (PEO), and mixtures thereof.

Alternatively, other than the liquid nonaqueous electrolyte and gel nonaqueous electrolyte, an ambient temperature molten salt (ionic melt) including lithium ions, a polymer solid electrolyte, an inorganic solid electrolyte, or the like may be used as the nonaqueous electrolyte.

The ambient temperature molten salt (ionic melt) indicates compounds among organic salts made of combinations of organic cations and anions, which are able to exist in a liquid state at ambient temperature (15° C. to 25° C.). The ambient temperature molten salt includes an ambient temperature molten salt which exists alone as a liquid, an ambient temperature molten salt which becomes a liquid upon mixing with an electrolyte salt, an ambient temperature molten salt which becomes a liquid when dissolved in an organic solvent, and mixtures thereof. In general, the melting point of the ambient temperature molten salt used in secondary batteries is 25° C. or below. The organic cations generally have a quaternary ammonium framework.

The polymer solid electrolyte is prepared by dissolving the electrolyte salt in a polymeric material, and solidifying it.

The inorganic solid electrolyte is a solid substance having Li ion conductivity.

II. Container Member

As the container member, for example, a container made of laminated film or a container made of metal may be used.

The thickness of the laminated film is, for example, 0.5 mm or less, and preferably 0.2 mm or less.

As the laminated film, used is a multilayer film including multiple resin layers and a metal layer sandwiched between the resin layers. The resin layer may include, for example, a polymeric material such as polypropylene (PP), polyethylene (PE), nylon, or polyethylene terephthalate (PET). The metal layer is preferably made of aluminum foil or an aluminum alloy foil, so as to reduce weight. The laminated film may be formed into the shape of a container member, by heat-sealing.

The wall thickness of the metal container is, for example, 1 mm or less, more preferably 0.5 mm or less, and still more preferably 0.2 mm or less.

The metal container is made, for example, of aluminum or an aluminum alloy. The aluminum alloy preferably contains elements such as magnesium, zinc, or silicon. If the aluminum alloy contains a transition metal such as iron, copper, nickel, or chromium, the content thereof is preferably 100 ppm by mass or less.

The shape of the container member is not particularly limited. The shape of the container member may be, for example, flat (thin), square, cylindrical, coin-shaped, and button-shaped. The container member may be appropriately selected depending on battery size and use of the battery.

III. Negative electrode Terminal

The negative electrode terminal may be made of a material that is electrochemically stable at a potential range of 1 V to 3 V (vs. $Li/Li^+$) relative to the oxidation-reduction potential of lithium, and having electrical conductivity. Specific examples of the material for the negative electrode terminal include copper, nickel, stainless steel, aluminum, and aluminum alloy containing at least one selected from the group consisting of Mg, Ti, Zn, Mn, Fe, Cu, and Si. Aluminum or aluminum alloy is preferred as the material for the negative electrode terminal. The negative electrode terminal is preferably made of the same material as the negative electrode current collector, in order to reduce contact resistance between the negative electrode terminal and the negative electrode current collector.

IV. Positive Electrode Terminal

The positive electrode terminal may be made of, for example, a material that is electrically stable in the potential range of 3 V to 4.5 V (vs. $Li/Li^+$) relative to the oxidation-reduction potential of lithium, and having electrical conductivity. Examples of the material for the positive electrode terminal include aluminum and an aluminum alloy containing one or more selected from the group consisting of Mg, Ti, Zn, Mn, Fe, Cu, and Si. The positive electrode terminal is preferably made of the same material as the positive electrode current collector, in order to reduce contact resistance between the positive electrode terminal and the positive electrode current collector.

Next, the secondary battery according to the second embodiment will be more concretely described with reference to the drawings.

Figure 4:
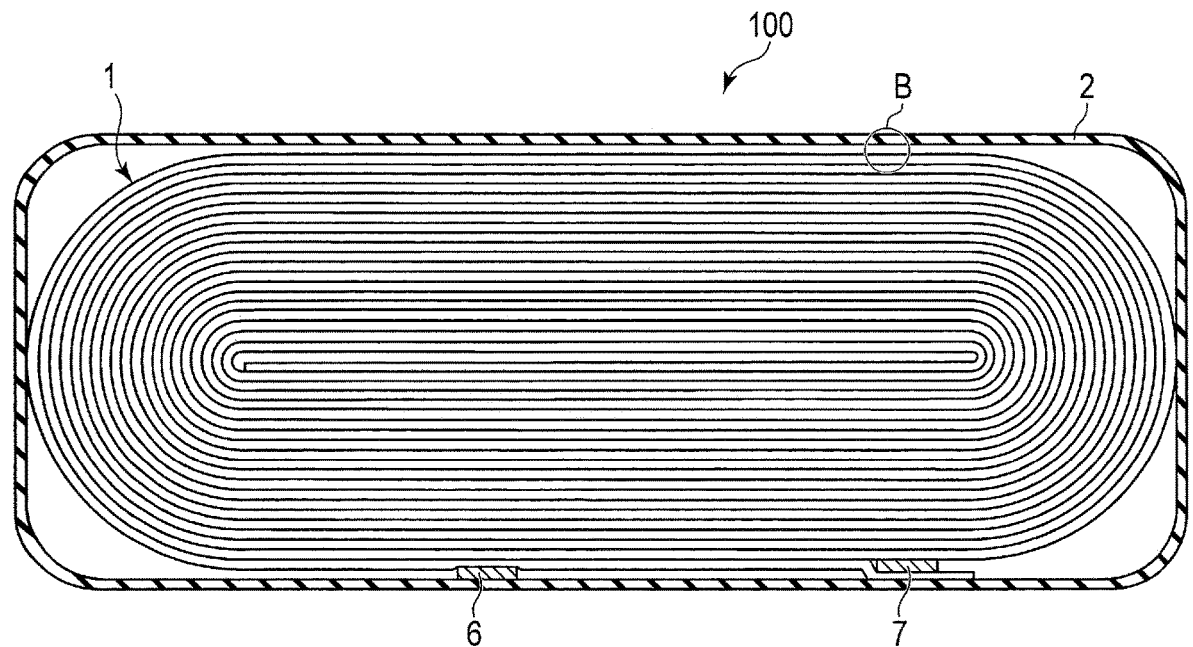
FIG. 4 is a cross-sectional view schematically showing an example of a secondary battery according to an embodiment.
Figure 5:
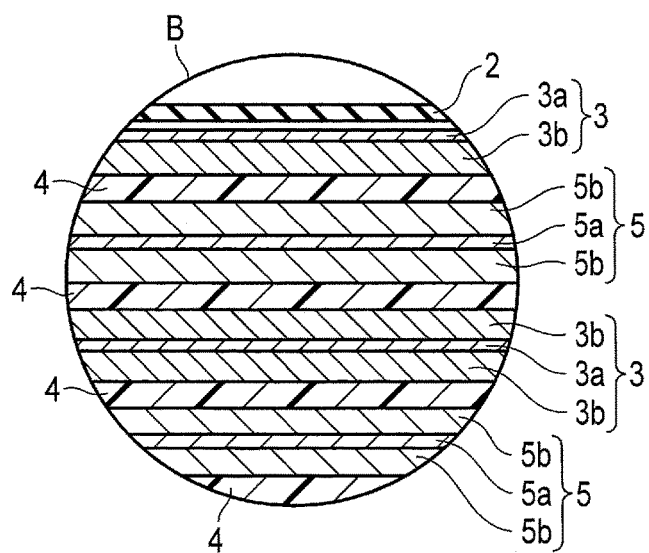
FIG. 5 is an enlarged cross-sectional view of section B of the secondary battery shown in FIG. 4.

FIG. 4 is a cross-sectional view schematically showing an example of a secondary battery according to the second embodiment. FIG. 5 is an enlarged cross-sectional view of section B of the secondary battery shown in FIG. 4.

The secondary battery 100 shown in FIGS. 4 and 5 includes a bag-shaped container member 2 shown in FIG. 4, an electrode group 1 shown in FIGS. 4 and 5, and an electrolyte, which is not shown. The electrode group 1 and the electrolyte are housed in the bag-shaped container member 2. The electrolyte (not shown) is held in the electrode group 1.

The bag-shaped container member 2 is made of a laminated film including two resin layers and a metal layer sandwiched between the resin layers.

As shown in FIG. 4, the electrode group 1 is a wound electrode group in a flat form. The wound electrode group 1 in a flat form includes a negative electrode 3, a separator 4, and a positive electrode 5, as shown in FIG. 5. The separator 4 is sandwiched between the negative electrode 3 and the positive electrode 5.

The negative electrode 3 includes a negative electrode current collector 3a and a negative electrode active material-containing layer 3b. At the portion of the negative electrode 3 positioned outermost among the wound electrode group 1, the negative electrode active material-containing layer 3b is formed only on an inner surface of the negative electrode current collector 3a, as shown in FIG. 5. For the other portions of the negative electrode 3, negative electrode active material-containing layers 3b are formed on both of reverse surfaces of the negative electrode current collector 3a.

The positive electrode 5 includes a positive electrode current collector 5a and positive electrode active material-containing layers 5b formed on both of reverse surfaces of the positive electrode current collector 5a.

As shown in FIG. 4, a negative electrode terminal 6 and positive electrode terminal 7 are positioned in vicinity of the outer peripheral end of the wound electrode group 1. The negative electrode terminal 6 is connected to a portion of the negative electrode current collector 3a positioned outermost. The positive electrode terminal 7 is connected to a portion of the positive electrode current collector 5a positioned outermost. The negative electrode terminal 6 and the positive electrode terminal 7 extend out from an opening of the bag-shaped container member 2. A thermoplastic resin layer is provided on the inner surface of the bag-shaped container member 2, and the opening is sealed by heat-sealing the resin layer.

The secondary battery according to the second embodiment includes the electrode according to the first embodiment.

Therefore, electrical resistance is suppressed in the secondary battery according to the second embodiment, and the secondary battery can exhibit excellent output performance.

Third Embodiment

According to a third embodiment, a battery module is provided. The battery module according to the third embodiment includes plural of secondary batteries according to the second embodiment.

In the battery module according to the third embodiment, each of the single-batteries may be arranged to be electrically connected in series or in parallel, or may be arranged in combination of in-series connection and in-parallel connection.

An example of the battery module according to the third embodiment will be described next, with reference to the drawings.

Figure 6:
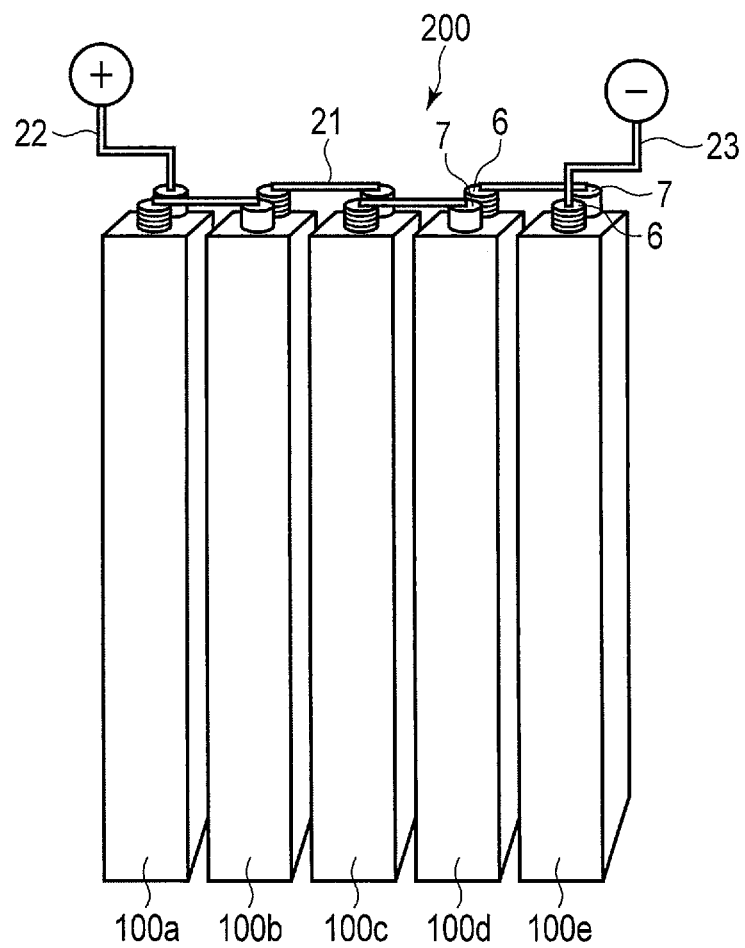
FIG. 6 is a perspective view schematically showing an example of a battery module according to an embodiment.

FIG. 6 is a perspective view schematically showing an example of the battery module according to the third embodiment.

The battery module 200 shown in FIG. 6 includes five single-batteries 100a to 100e, four bus bars 21, a positive electrode-side lead 22, and a negative electrode-side lead 23. Each of the five single-batteries 100a to 100e is the secondary battery according to the second embodiment.

The bus bar 21 connects, for example, a negative electrode terminal 6 of one single-battery 100a and a positive electrode terminal 7 of the single-battery 100b positioned adjacent. In such a manner, five single-batteries 100 are thus connected in series by the four bus bars 21. That is, the battery module 200 shown in FIG. 6 is a battery module of five-in-series connection. Although no example is depicted in drawing, in a battery module including plural single-batteries that are electrically connected in parallel, for example, the plural single-batteries may be electrically connected by having plural negative electrode terminals being connected to each other by bus bars while having plural positive electrode terminals being connected to each other by bus bars.

The positive electrode terminal 7 of at least one battery among the five single-batteries 100a to 100e is electrically connected to the positive electrode-side lead 22 for external connection. In addition, the negative electrode terminal 6 of at least one battery among the five single-batteries 100a to 100e is electrically connected to the negative electrode-side lead 23 for external connection.

The battery module according to the third embodiment includes the secondary battery according to the second embodiment. In the battery module, electrical resistance is suppressed, whereby the battery module can exhibit excellent output performance.

Fourth Embodiment

According to a fourth embodiment, a battery pack is provided. The battery pack includes a battery module according to the third embodiment. The battery pack may include a single secondary battery according to the second embodiment, in place of the battery module according to the third embodiment.

The battery pack according to the fourth embodiment may further include a protective circuit. The protective circuit has a function to control charging and discharging of the secondary battery. Alternatively, a circuit included in equipment where the battery pack serves as a power source (for example, electronic devices, automobiles, and the like) may be used as the protective circuit for the battery pack.

Moreover, the battery pack according to the fourth embodiment may further include an external power distribution terminal. The external power distribution terminal is configured to externally output current from the secondary battery, and/or to input external current into the secondary battery. In other words, when the battery pack is used as a power source, the current is provided out via the external power distribution terminal. When the battery pack is charged, the charging current (including regenerative energy of motive force of vehicles such as automobiles) is provided to the battery pack via the external power distribution terminal.

Next, an example of a battery pack according to the fourth embodiment will be described with reference to the drawings.

Figure 7:
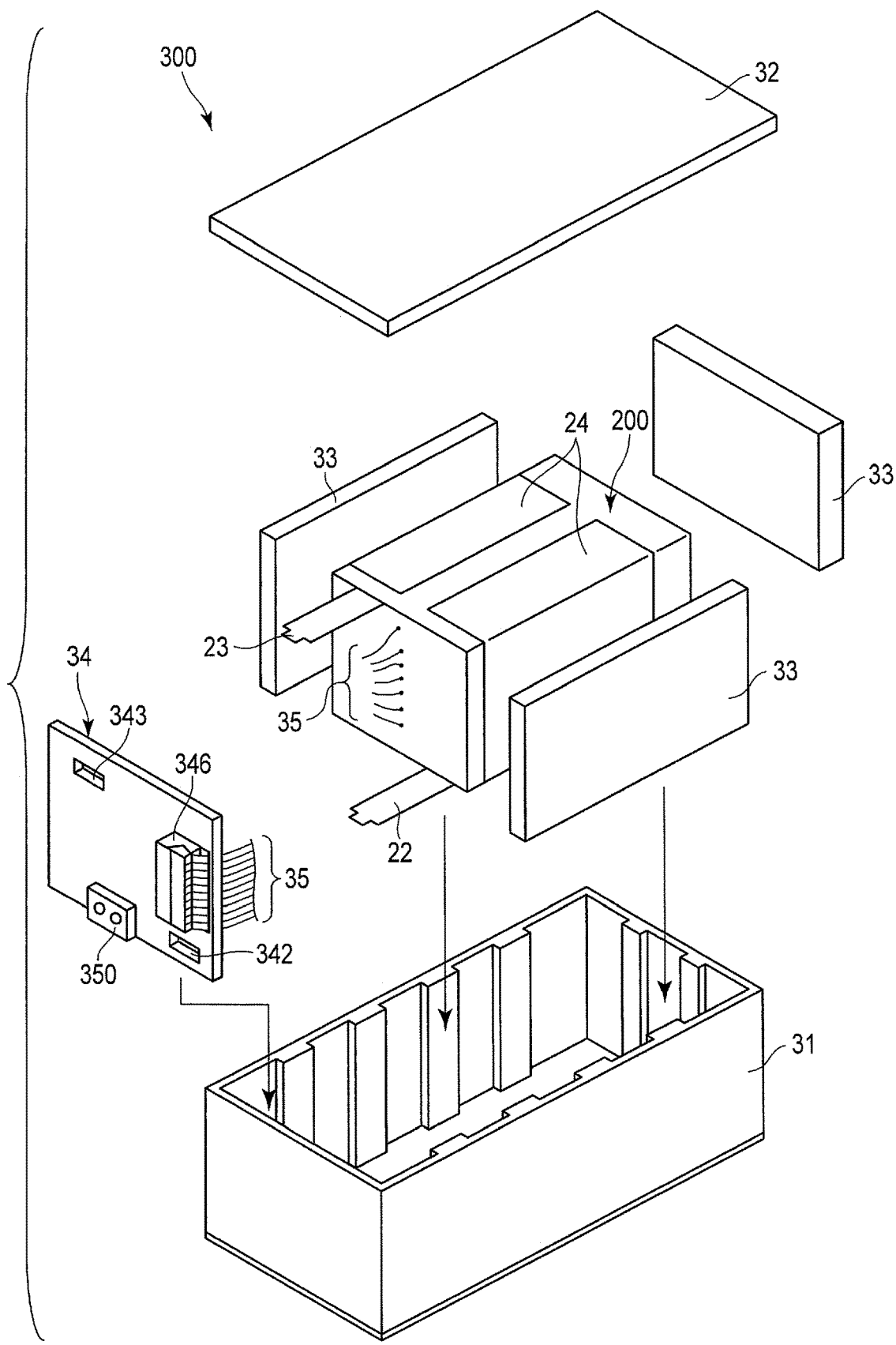
FIG. 7 is an exploded perspective view schematically showing an example of a battery pack according to an embodiment.
Figure 8:
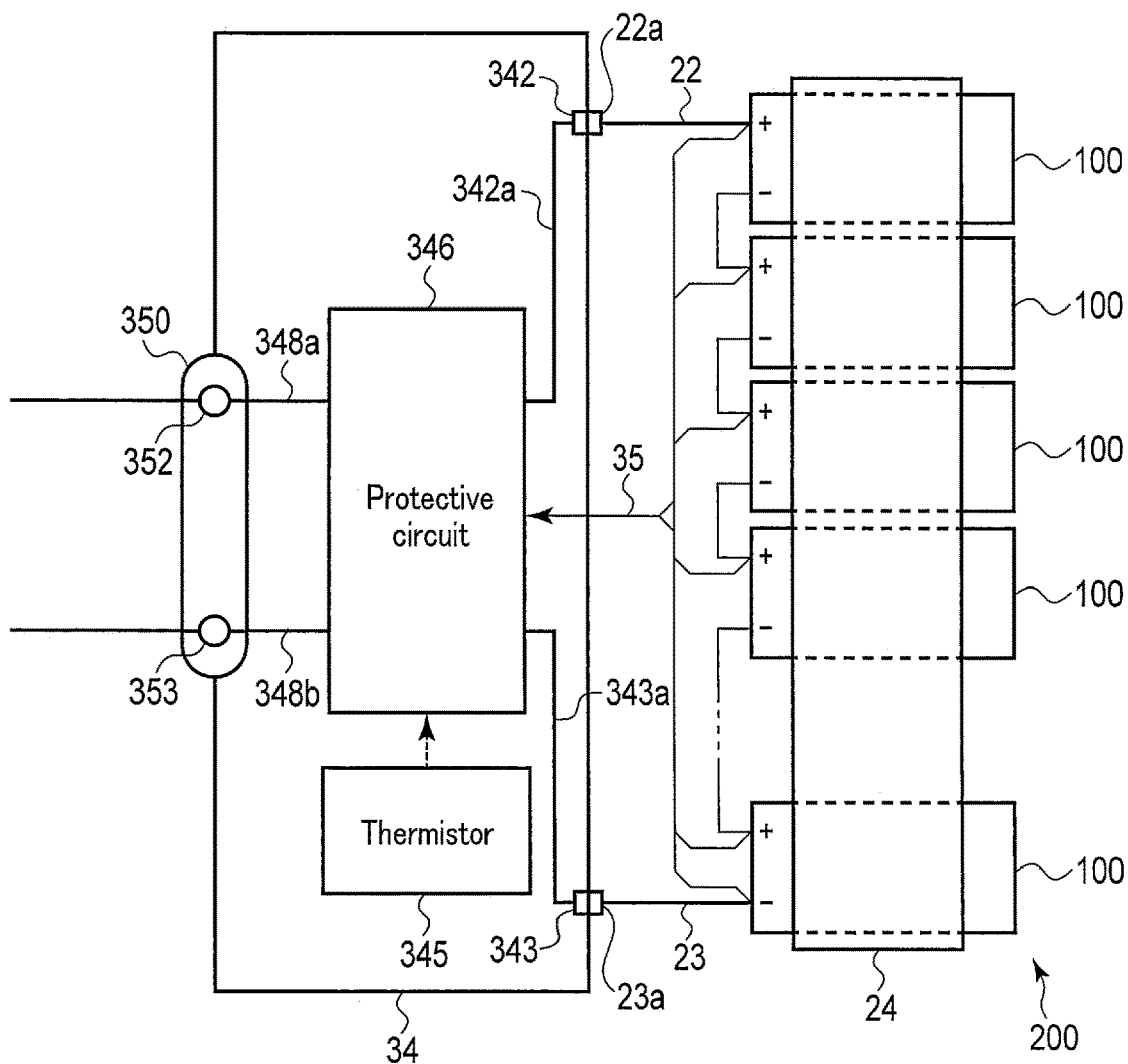
FIG. 8 is a block diagram showing an example of an electric circuit of the battery pack shown in FIG. 7.

FIG. 7 is an exploded perspective view schematically showing an example of the battery pack according to the fourth embodiment. FIG. 8 is a block diagram showing an example of an electric circuit of the battery pack shown in FIG. 7.

A battery pack 300 shown in FIGS. 7 and 8 includes a housing container 31, a lid 32, protective sheets 33, a battery module 200, a printed wiring board 34, wires 35, and an insulating plate (not shown).

The housing container 31 shown in FIG. 7 is a square bottomed container having a rectangular bottom surface. The housing container 31 is configured to be capable of housing the protective sheets 33, the battery module 200, the printed wiring board 34, and the wires 35. The lid 32 has a rectangular shape. The lid 32 covers the housing container 31 to house the battery module 200 and such. Although not illustrated, the housing container 31 and the lid 32 are provided with openings, connection terminals, or the like for connection to an external device or the like.

The battery module 200 includes plural single-batteries 100, a positive electrode-side lead 22, a negative electrode-side lead 23, and adhesive tape(s) 24.

At least one of the plural single-batteries 100 is a secondary battery according to the second embodiment. The plural single-batteries 100 are electrically connected in series, as shown in FIG. 8. The plural single-batteries 100 may alternatively be electrically connected in parallel, or connected in a combination of in-series connection and in-parallel connection. If the plural single-batteries 100 are connected in parallel, the battery capacity increases as compared to a case in which they are connected in series.

The adhesive tape(s) 24 fastens the plural single-batteries 100. The plural single-batteries 100 may be fixed using a heat shrinkable tape in place of the adhesive tape(s) 24. In this case, protective sheets 33 are arranged on both side surfaces of the battery module 200, and the heat shrinkable tape is wound around the battery module 200 and protective sheets 33. After that, the heat shrinkable tape is shrunk by heating to bundle the plural single-batteries 100.

One end of the positive electrode-side lead 22 is connected to the battery module 200. The one end of the positive electrode-side lead 22 is electrically connected to the positive electrode(s) of one or more single-battery 100. One end of the negative electrode-side lead 23 is connected to the battery module 200. The one end of the negative electrode-side lead 23 is electrically connected to the negative electrode (s) of one or more single-battery 100.

The printed wiring board 34 is provided along one face in the short side direction among the inner surfaces of the housing container 31. The printed wiring board 34 includes a positive electrode-side connector 342, a negative electrode-side connector 343, a thermistor 345, a protective circuit 346, wirings 342a and 343a, an external power distribution terminal 350, a plus-side wiring (positive-side wiring) 348a, and a minus-side wiring (negative-side wiring) 348b. One principal surface of the printed wiring board 34 faces one side surface of the battery module 200. An insulating plate (not shown) is disposed in between the printed wiring board 34 and the battery module 200.

The other end 22a of the positive electrode-side lead 22 is electrically connected to the positive electrode-side connector 342. The other end 23a of the negative electrode-side lead 23 is electrically connected to the negative electrode-side connector 343.

The thermistor 345 is fixed to one principal surface of the printed wiring board 34. The thermistor 345 detects the temperature of each single-battery 100 and transmits detection signals to the protective circuit 346.

The external power distribution terminal 350 is fixed to the other principal surface of the printed wiring board 34. The external power distribution terminal 350 is electrically connected to device (s) that exists outside the battery pack 300. The external power distribution terminal 350 includes a positive-side terminal 352 and a negative-side terminal 353.

The protective circuit 346 is fixed to the other principal surface of the printed wiring board 34. The protective circuit 346 is connected to the positive-side terminal 352 via the plus-side wiring 348a. The protective circuit 346 is connected to the negative-side terminal 353 via the minus-side wiring 348b. In addition, the protective circuit 346 is electrically connected to the positive electrode-side connector 342 via the wiring 342a. The protective circuit 346 is electrically connected to the negative electrode-side connector 343 via the wiring 343a. Furthermore, the protective circuit 346 is electrically connected to each of the plural single-batteries 100 via the wires 35.

The protective sheets 33 are arranged on both inner surfaces of the housing container 31 along the long side direction and on the inner surface along the short side direction facing the printed wiring board 34 across the battery module 200. The protective sheets 33 are made of, for example, resin or rubber.

The protective circuit 346 controls charge and discharge of the plural single-batteries 100. The protective circuit 346 is also configured to cut-off electric connection between the protective circuit 346 and the external power distribution terminal 350 (positive-side terminal 352, negative-side terminal 353) to external device(s), based on detection signals transmitted from the thermistor 345 or detection signals transmitted from each single-battery 100 or the battery module 200.

An example of the detection signal transmitted from the thermistor 345 is a signal indicating that the temperature of the single-battery(s) 100 is detected to be a predetermined temperature or more. An example of the detection signal transmitted from each single-battery 100 or the battery module 200 include a signal indicating detection of over-charge, over-discharge, and overcurrent of the single-battery (s) 100. When detecting over charge or the like for each of the single batteries 100, the battery voltage may be detected, or a positive electrode potential or negative electrode potential may be detected. In the latter case, a lithium electrode to be used as a reference electrode may be inserted into each single battery 100.

Note, that as the protective circuit 346, a circuit included in a device (for example, an electronic device or an automobile) that uses the battery pack 300 as a power source may be used.

As described above, the battery pack 300 includes the external power distribution terminal 350. Hence, the battery pack 300 can output current from the battery module 200 to an external device and input current from an external device to the battery module 200 via the external power distribution terminal 350. In other words, when using the battery pack 300 as a power source, the current from the battery module 200 is supplied to an external device via the external power distribution terminal 350. When charging the battery pack 300, a charge current from an external device is supplied to the battery pack 300 via the external power distribution terminal 350. If the battery pack 300 is used as an onboard battery, the regenerative energy of the motive force of a vehicle can be used as the charge current from the external device.

Note that the battery pack 300 may include plural battery modules 200. In this case, the plural battery modules 200 may be connected in series, in parallel, or connected in a combination of in-series connection and in-parallel connection. The printed wiring board 34 and the wires 35 may be omitted. In this case, the positive electrode-side lead 22 and the negative electrode-side lead 23 may respectively be used as the positive-side terminal 352 and negative-side terminal 353 of the external power distribution terminal 350.

Such a battery pack is used, for example, in applications where excellent cycle performance is demanded when a large current is extracted. More specifically, the battery pack is used as, for example, a power source for electronic devices, a stationary battery, or an onboard battery for various kinds of vehicles. An example of the electronic device is a digital camera. The battery pack is particularly favorably used as an onboard battery.

The battery pack according to the fourth embodiment is provided with the secondary battery according to the second embodiment or the battery module according to the third embodiment. Accordingly, in the battery pack, electrical resistance is suppressed, whereby the battery pack can exhibit excellent output performance.

Fifth Embodiment

According to a fifth embodiment, a vehicle is provided. The battery pack according to the fourth embodiment is installed on this vehicle.

In the vehicle according to the fifth embodiment, the battery pack is configured, for example, to recover regenerative energy from motive force of the vehicle. The vehicle may include a mechanism (a regenerator) configured to convert kinetic energy of the vehicle into regenerative energy.

Examples of the vehicle according to the fifth embodiment include two-wheeled to four-wheeled hybrid electric automobiles, two-wheeled to four-wheeled electric automobiles, electrically assisted bicycles, and railway cars.

In the vehicle according to the fifth embodiment, the installing position of the battery pack is not particularly limited. For example, when installing the battery pack on an automobile, the battery pack may be installed in the engine compartment of the automobile, in rear parts of the vehicle body, or under seats.

The vehicle according to the fifth embodiment may have plural battery packs installed. In such a case, batteries included in each of the battery packs may be electrically connected to each other in series, electrically connected in parallel, or electrically connected in a combination of in-series connection and in-parallel connection. For example, in a case where each battery pack includes a battery module, the battery modules may be electrically connected to each other in series, electrically connected in parallel, or electrically connected in a combination of in-series connection and in-parallel connection. Alternatively, in a case where each battery pack includes a single battery, each of the batteries may be electrically connected to each other in series, electrically connected in parallel, or electrically connected in a combination of in-series connection and in-parallel connection.

An example of the vehicle according to the fifth embodiment is explained below, with reference to the drawings.

Figure 9:
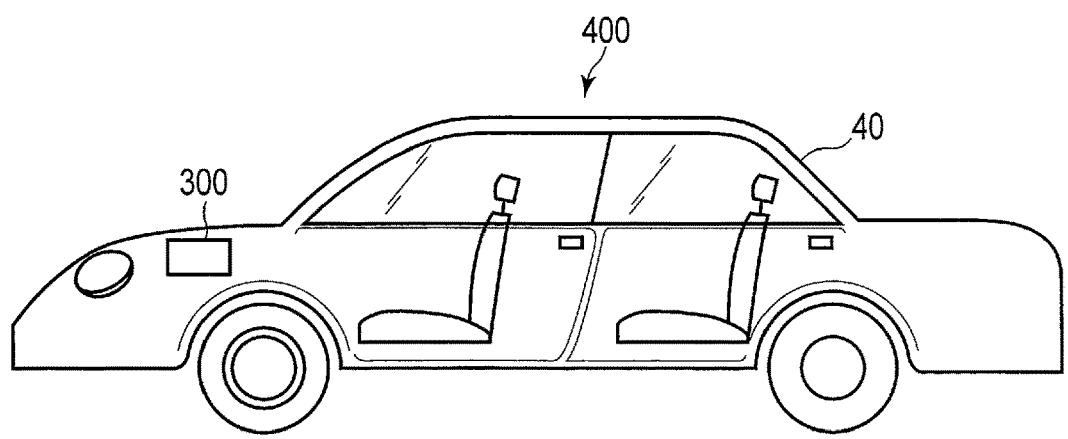
FIG. 9 is a partially see-through diagram schematically showing an example of a vehicle according to an embodiment.

FIG. 9 is a partially see-through diagram schematically showing an example of a vehicle according to the fifth embodiment.

A vehicle 400, shown in FIG. 9 includes a vehicle body 40 and a battery pack 300 according to the fourth embodiment.

In the example shown in FIG. 9, the vehicle 400 is a four-wheeled automobile.

This vehicle 400 may have plural battery packs 300 installed. In such a case, the batteries (e.g., single-batteries or battery module) included in the battery packs 300 may be connected in series, connected in parallel, or connected in a combination of in-series connection and in-parallel connection.

In FIG. 9, depicted is an example where the battery pack 300 is installed in an engine compartment located at the front of the vehicle body 40. As mentioned above, for example, the battery pack 300 may be alternatively installed in rear sections of the vehicle body 40, or under a seat. The battery pack 300 may be used as a power source of the vehicle 400. The battery pack 300 can also recover regenerative energy of motive force of the vehicle 400.

Figure 10:
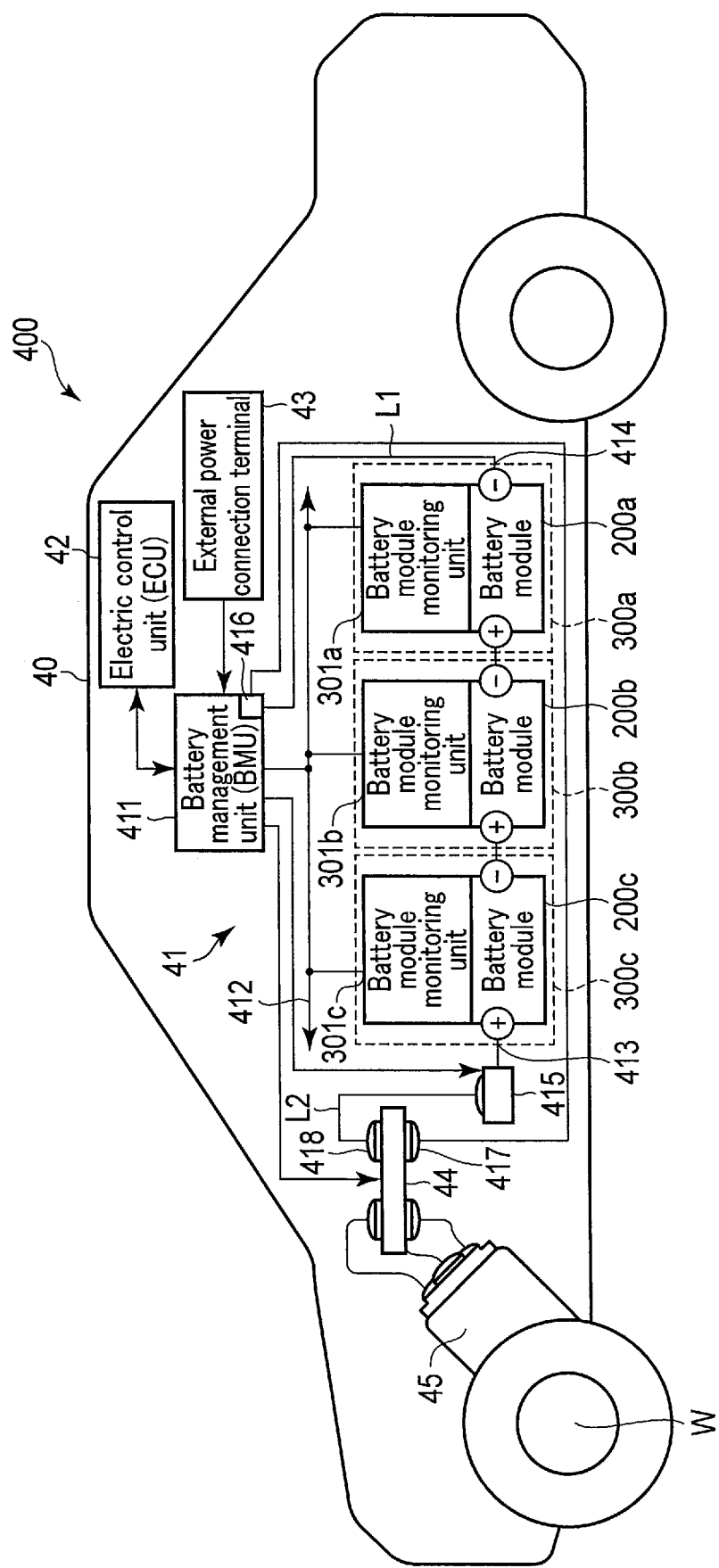
FIG. 10 is a diagram schematically showing an example of a control system related to an electric system in the vehicle according to an embodiment.

Next, with reference to FIG. 10, an aspect of operation of the vehicle according to the fifth embodiment is explained.

FIG. 10 is a diagram schematically showing an example of a control system related to an electric system in the vehicle according to the fifth embodiment. A vehicle 400, shown in FIG. 10, is an electric automobile.

The vehicle 400, shown in FIG. 10, includes a vehicle body 40, a vehicle power source 41, a vehicle ECU (electric control unit) 42, which is a master controller of the vehicle power source 41, an external terminal (an external power connection terminal) 43, an inverter 44, and a drive motor 45.

The vehicle 400 includes the vehicle power source 41, for example, in the engine compartment, in the rear sections of the automobile body, or under a seat. In FIG. 10, the position of the vehicle power source 41 installed in the vehicle 400 is schematically shown.

The vehicle power source 41 includes plural (for example, three) battery packs 300a, 300b and 300c, a battery management unit (BMU) 411, and a communication bus 412.

The battery pack 300a includes a battery module 200a and a battery module monitoring unit 301a (e.g., a VTM: voltage temperature monitoring). The battery pack 300b includes a battery module 200b and a battery module monitoring unit 301b. The battery pack 300c includes a battery module 200c and a battery module monitoring unit 301c. The battery packs 300a to 300c are battery packs similar to the aforementioned battery pack 300, and the battery modules 200a to 200c are battery modules similar to the aforementioned battery module 200. The battery modules 200a to 200c are electrically connected in series. The battery packs 300a, 300b and 300c can each be independently removed, and may be exchanged by a different battery pack 300.

Each of the battery modules 200a to 200c includes plural single-batteries connected in series. At least one of the plural single-batteries is the secondary battery according to the second embodiment. The battery modules 200a to 200c each perform charging and discharging via a positive electrode terminal 413 and a negative electrode terminal 414.

The battery management unit 411 performs communication with the battery module monitoring units 301a to 301c and collects information such as voltages or temperatures for each of the single-batteries 100 included in the battery modules 200a to 200c included in the vehicle power source 41. In this manner, the battery management unit 411 collects information concerning security of the vehicle power source 41.

The battery management unit 411 and the battery module monitoring units 301a to 301c are connected via the communication bus 412. In communication bus 412, a set of communication lines is shared at multiple nodes (i.e., the battery management unit 411 and one or more battery module monitoring units 301a to 301c). The communication bus 412 is, for example, a communication bus configured based on CAN (Control Area Network) standard.

The battery module monitoring units 301a to 301c measure a voltage and a temperature of each single-battery in the battery modules 200a to 200c based on commands from the battery management unit 411. It is possible, however, to measure the temperatures only at several points per battery module, and the temperatures of all of the single-batteries need not be measured.

The vehicle power source 41 may also have an electromagnetic contactor (for example, a switch unit 415 shown in FIG. 10) for switching on and off electrical connection between the positive electrode terminal 413 and the negative electrode terminal 414. The switch unit 415 includes a precharge switch (not shown), which is turned on when the battery modules 200a to 200c are charged, and a main switch (not shown), which is turned on when output from the battery modules 200a to 200c is supplied to a load. The precharge switch and the main switch each include a relay circuit (not shown), which is switched on or off based on a signal provided to a coil disposed near the switch elements. The magnetic contactor such as the switch unit 415 is controlled based on control signals from the battery management unit 411 or the vehicle ECU 42, which controls the operation of the entire vehicle 400.

The inverter 44 converts an inputted direct current voltage to a three-phase alternate current (AC) high voltage for driving a motor. Three-phase output terminal(s) of the inverter 44 is (are) connected to each three-phase input terminal of the drive motor 45. The inverter 44 is controlled based on control signals from the battery management unit 411 or the vehicle ECU 42, which controls the entire operation of the vehicle. Due to the inverter 44 being controlled, output voltage from the inverter 44 is adjusted.

The drive motor 45 is rotated by electric power supplied from the inverter 44. The drive generated by rotation of the motor 45 is transferred to an axle and driving wheels W via a differential gear unit, for example.

The vehicle 400 also includes a regenerative brake mechanism (a regenerator), though not shown. The regenerative brake mechanism rotates the drive motor 45 when the vehicle 400 is braked, and converts kinetic energy into regenerative energy, as electric energy. The regenerative energy, recovered in the regenerative brake mechanism, is inputted into the inverter 44 and converted to direct current. The converted direct current is inputted into the vehicle power source 41.

One terminal of a connecting line L1 is connected to the negative electrode terminal 414 of the vehicle power source 41. The other terminal of the connecting line L1 is connected to a negative electrode input terminal 417 of the inverter 44. A current detector (current detecting circuit) 416 in the battery management unit 411 is provided on the connecting line L1 in between the negative electrode terminal 414 and negative electrode input terminal 417.

One terminal of a connecting line L2 is connected to the positive electrode terminal 413 of the vehicle power source 41. The other terminal of the connecting line L2 is connected to a positive electrode input terminal 418 of the inverter 44. The switch unit 415 is provided on the connecting line L2 in between the positive electrode terminal 413 and the positive electrode input terminal 418.

The external terminal 43 is connected to the battery management unit 411. The external terminal 43 is able to connect, for example, to an external power source.

The vehicle ECU 42 performs cooperative control of the vehicle power source 41, switch unit 415, inverter 44, and the like, together with other management units and control units including the battery management unit 411 in response to inputs operated by a driver or the like. Through the cooperative control by the vehicle ECU 42 and the like, output of electric power from the vehicle power source 41, charging of the vehicle power source 41, and the like are controlled, thereby performing the management of the whole vehicle 400. Data concerning the security of the vehicle power source 41, such as a remaining capacity of the vehicle power source 41, are transferred between the battery management unit 411 and the vehicle ECU 42 via communication lines.

The vehicle according to the fifth embodiment is installed with the battery pack according to the fourth embodiment. Thus, a vehicle of high performance can be provided.

EXAMPLES

Examples will be described hereinafter, but embodiments of the present invention are not limited to the examples shown below, so long as the spirit of the present invention is not exceeded.

Example 1

In Example 1, an electrode group and a nonaqueous electrolyte battery including the electrode group were produced according to the procedure described below.

<Fabrication of Negative Electrode>

Particles of a monoclinic niobium titanium composite oxide having a composition represented by $TiNb_2O_7$ were prepared as a negative electrode active material. The negative electrode active material particles had a primary particle shape and an average particle size of 3 μm. In addition, acetylene black was provided as an electro-conductive agent, and carboxymethyl cellulose and styrene-butadiene rubber were provided as binders. They were mixed in pure water at a mass ratio of negative electrode active material: acetylene black:carboxymethyl cellulose:styrene-butadiene rubber being 90:5:2.5:2.5, to obtain a slurry. The resultant slurry was applied onto both sides of a current collector made of an aluminum foil having a thickness of 15 μm, and the coating film was dried. In this manner, a composite including a current collector and a negative electrode active material-containing layer formed on both sides of the current collector was obtained. An amount of coating per one side of the negative electrode active material-containing layer was 90 g/m². The width of the negative electrode was adjusted by a slitting apparatus, whereby the coating width of the negative electrode was made to be 80 mm, and the width of an aluminum foil with no electrode applied thereto was made to be 10 mm. Next, the composite thus obtained was subjected to roll pressing so that the density of the negative electrode active material-containing layer became 2.55 g/cm³. Then, the composite was further vacuum-dried, whereby the negative electrode was obtained.

<Fabrication of Positive Electrode>

Particles of a lithium nickel cobalt manganese composite oxide represented by $LiNi_{0.5}Co_{0.2}Mn_{0.3}O_2$ were provided as a positive electrode active material. In addition, acetylene black was provided as an electro-conductive agent, and polyvinylidene fluoride (PVdF) was provided as a binder. They were mixed at a mass ratio of positive electrode active material:electro-conductive agent:binder being 90:5:5, to obtain a mixture. Next, the mixture thus obtained was dispersed in an n-methylpyrrolidone (NMP) solvent to prepare a positive electrode slurry. The resultant slurry was applied onto both sides of a current collector made of an aluminum foil having a thickness of 15 μm, and the coating film was dried. In this manner, a composite including a current collector and a positive electrode active material-containing layer formed on both sides of the current collector was obtained. An amount of coating per one side of the positive electrode active material-containing layer was 100 g/m². The width of the positive electrode was adjusted by a slitting apparatus, whereby the coating width of the positive electrode was made to be 80 mm, and the width of an aluminum foil with no electrode applied thereto was made to be 10 mm. Next, the composite thus obtained was subjected to roll pressing so that the density of the positive electrode active material-containing layer became 3.05 g/cm³. Then, the composite was further vacuum-dried, whereby the positive electrode was obtained.

<Production of Electrode Group>

A polyethylene separator having a thickness of 15 μm was prepared. Next, the prepared separator, the above negative electrode, and the above positive electrode were stacked in the order of the negative electrode, separator, positive electrode, and separator, to obtain a stack. Then, the resultant stack was spirally wound so that a part of the negative electrode was positioned on the outermost side, whereby a wound body was obtained. The number of windings of the wound body was 60. Then, the wound body was pressed. The pressing of the wound body was performed at room temperature (25° C.) and by applying a load of 80 kN to the wound body for one minute. In this manner, an electrode group was produced.

When the electrode group was disassembled, it was confirmed that the negative electrode had cut portions (slits) up to the third winding from the innermost portion. Also, the length of the cut portion (average total length of cut portion/first length $L_A$) with respect to the length (the first length $L_A$ in the first direction) of the wound electrode group along the center of the winding was examined.

<Preparation of Nonaqueous Electrolyte>

A nonaqueous electrolyte was prepared according to the following procedure. First, propylene carbonate (PC) and diethyl carbonate (DEC) were mixed at a volume ratio PC:DEC being 1:2, to obtain a mixed solvent. Lithium hexafluorophosphate $LiPF_6$ was dissolved in the mixed solvent at a concentration of 1 M to obtain a liquid nonaqueous electrolyte.

<Assembly of Battery>

The electrode group produced as described above was inserted into a laminated film container. The liquid nonaqueous electrolyte prepared as described above was poured into the container. Thereby, the nonaqueous electrolyte was made to be held in the electrode group. Next, the container was sealed, whereby a nonaqueous electrolyte battery was obtained.

Example 2

An electrode group and a nonaqueous electrolyte battery were produced by the same procedure as described in Example 1, except that the negative electrode density was adjusted to 2.6 g/cm³. When the electrode group was disassembled, it was confirmed that the negative electrode had cut portions up to the sixth winding from the innermost portion.

Example 3

An electrode group and a nonaqueous electrolyte battery were produced by the same procedure as described in Example 1, except that the negative electrode density was adjusted to 2.7 g/cm³. When the electrode group was disassembled, it was confirmed that the negative electrode had cut portions up to the twelfth winding from the innermost portion.

Example 4

An electrode group and a nonaqueous electrolyte battery were produced by the same procedure as described in Example 1, except that the pressing of the wound stack of the negative electrode, positive electrode, and separator was performed by applying a load of 80 kN for three minutes. When the electrode group was disassembled, it was confirmed that the negative electrode had cut portions up to the sixth winding from the innermost portion.

Example 5

An electrode group and a nonaqueous electrolyte battery were produced by the same procedure as described in Example 1, except that the pressing of the wound stack of the negative electrode, positive electrode, and separator was performed at a temperature of 60° C. and by applying a load of 80 kN for one minute. When the electrode group was disassembled, it was confirmed that the negative electrode had cut portions up to the second winding from the innermost portion.

Example 6

Particles of a monoclinic niobium titanium composite oxide having a composition represented by $TiNb_2O_7$ were prepared as a negative electrode active material. The negative electrode active material particles had a primary particle shape and an average particle size of 1 μm. An electrode group and a nonaqueous electrolyte battery were produced by the same procedure as described in Example 1, except that the above composite oxide particles were used as negative electrode active material particles instead of those used in Example 1, and the density of the negative electrode active material-containing layer was adjusted to 2.6 g/cm³. When the electrode group was disassembled, it was confirmed that the negative electrode had cut portions up to the tenth winding from the innermost portion.

Example 7

Particles of a monoclinic niobium titanium composite oxide having a composition represented by $TiNb_2O_7$ were prepared as a negative electrode active material. The negative electrode active material particles had a primary particle shape and an average particle size of 6 μm. An electrode group and a nonaqueous electrolyte battery were produced by the same procedure as described in Example 1, except that the above composite oxide particles were used as negative electrode active material particles instead of those used in Example 1, and the density of the negative electrode active material-containing layer was adjusted to 2.6 g/cm³. When the electrode group was disassembled, it was confirmed that the negative electrode had cut portions up to the fifth winding from the innermost portion.

Example 8

An electrode group and a nonaqueous electrolyte battery were produced by the same procedure as described in Example 1, except that an aluminum foil having a thickness of 20 μm was used instead of the one used as the negative electrode current collector in Example 1 and the negative electrode density was adjusted to 2.7 g/cm³. When the electrode group was disassembled, it was confirmed that the negative electrode had cut portions up to the seventh winding from the innermost portion.

Example 9

An electrode group and a nonaqueous electrolyte battery were produced by the same procedure as described in Example 1, except that a mass ratio of negative electrode active material:acetylene black:carboxymethyl cellulose: styrene-butadiene rubber was changed to 85:10:2.5:2.5. When the electrode group was disassembled, it was confirmed that the negative electrode had cut portions up to the ninth winding from the innermost portion.

Example 10

An electrode group and a nonaqueous electrolyte battery were produced by the same procedure as described in Example 1, except that a mass ratio of negative electrode active material:acetylene black:carboxymethyl cellulose: styrene-butadiene rubber was changed to 85:8:3.5:3.5. When the electrode group was disassembled, it was confirmed that the negative electrode had cut portions up to the twelfth winding from the innermost portion.

Example 11

An orthorhombic Na-containing titanium niobium composite oxide having a composition represented by $Li_2Na_{1.8}Ti_{5.8}Nb_{0.2}O_{14}$ was provided as a negative electrode active material. The particles of the composite oxide prepared had a primary particle shape and an average particle size of 3 μm. An electrode group and a nonaqueous electrolyte battery were produced by the same procedure as described in Example 1, except that the above composite oxide particles were used as negative electrode active material particles instead of those used in Example 1, the amount of coating per one side of the negative electrode active material-containing layer was changed to 145 g/m², and the density of the negative electrode active material-containing layer was adjusted to 2.5 g/cm³. When the electrode group was disassembled, it was confirmed that the negative electrode had cut portions up to the second winding from the innermost portion.

Comparative Example 1

An electrode group and a nonaqueous electrolyte battery were produced by the same procedure as described in Example 1, except that the pressing of the wound stack of the negative electrode, positive electrode, and separator was performed by applying a load of 30 kN for thirty seconds. When the electrode group was disassembled, neither of any notches or cut portions were observed.

Comparative Example 2

An electrode group and a nonaqueous electrolyte battery were produced by the same procedure as described in Example 1, except that a mass ratio of negative electrode active material:acetylene black:carboxymethyl cellulose: styrene-butadiene rubber was changed to 85:5:5:5. When the electrode group was disassembled, it was confirmed that the negative electrode had cut portions up to the sixteenth winding from the innermost portion.

Comparative Example 3

An electrode group and a nonaqueous electrolyte battery were produced by the same procedure as described in Comparative Example 1, except that the negative electrode density was adjusted to 2.3 g/cm³. When the electrode group was disassembled, neither of any notches or cut portions were observed.

EVALUATION

The output performance was evaluated using the nonaqueous electrolyte batteries produced in Examples 1 to 11 and Comparative Examples 1 to 3, as described below. Discharge capacities upon discharging at a 0.2 C rate and at a 5 C rate from a fully charged state to a discharged state were measured. A ratio of the discharge capacity upon discharging at a 5 C rate to the discharge capacity upon discharging at a 0.2 C rate ([5 C discharge capacity/0.2 C discharge capacity]×100%), namely, a 5 C/0.2 C discharge capacity ratio was calculated.

Specifically, charge and discharge were performed under the following conditions, and the discharge capacity was measured during discharge. The charge was performed in a constant current-constant voltage mode. The charge rate was 1 C. The charge voltage was 2.85 V. The condition for charge termination was a point of time when the current reached a current value of 0.05 C. The discharge was performed in a constant current mode at the above discharge rates (0.2 C and 5 C). The discharge termination voltage was 1.5 V.

The designs of the respective electrode groups and nonaqueous electrolyte batteries produced, the details of the cut portions confirmed in the disassembled electrode groups, and the results of the evaluation of the nonaqueous electrolyte batteries are summarized in Tables 1 and 2 below. Table 1 shows the details of the negative electrodes. As the details of the negative electrodes, the composition of the negative electrode active material, the average particle size (average primary particle size) of the negative electrode active material particles, the content of the negative electrode active material, the content of the electro-conductive agent, the content of the binder, and the density of the negative electrode active material-containing layer are shown in Table 1. Table 2 shows the conditions of pressing performed after winding the stack of the negative electrode, positive electrode, and separator when producing the electrode groups, the details of the cut portions confirmed in the electrode groups, and the output performance of the nonaqueous electrolyte batteries. As the conditions of pressing, indicated are pressing temperature, pressing load, and pressing time. As the details of the cut portions in the electrode groups, shown are the number of cuts in the negative electrode counted from the innermost lap side, and a value (units with respect to t) obtained by converting the number of cuts into thickness as explained above. As the output performance, 5 C/0.2 C discharge capacity ratios are shown in Table 2.

TABLE 1

|  | Negative Electrode Active Material | | Electro-conductive Agent | Binder | Negative Electrode | Negative Electrode Active Material-containing Layer Density (g/cm³) |
|---|---|---|---|---|---|---|
|  | Composition | Average Particle Size (μm) | Content (parts by mass) | Content (parts by mass) | Content (parts by mass) | Current Collector Thickness (μm) |
| Example 1 | TiNb$_2$O$_7$ | 3 | 90 | 5 | 5 | 15 | 2.55 |
| Example 2 | TiNb$_2$O$_7$ | 3 | 90 | 5 | 5 | 15 | 2.6 |
| Example 3 | TiNb$_2$O$_7$ | 3 | 90 | 5 | 5 | 15 | 2.7 |
| Example 4 | TiNb$_2$O$_7$ | 3 | 90 | 5 | 5 | 15 | 2.55 |
| Example 5 | TiNb$_2$O$_7$ | 3 | 90 | 5 | 5 | 15 | 2.55 |
| Example 6 | TiNb$_2$O$_7$ | 1 | 90 | 5 | 5 | 15 | 2.6 |
| Example 7 | TiNb$_2$O$_7$ | 6 | 90 | 5 | 5 | 15 | 2.6 |
| Example 8 | TiNb$_2$O$_7$ | 3 | 90 | 5 | 5 | 20 | 2.7 |
| Example 9 | TiNb$_2$O$_7$ | 3 | 85 | 10 | 5 | 15 | 2.55 |
| Example 10 | TiNb$_2$O$_7$ | 3 | 85 | 8 | 7 | 15 | 2.55 |
| Example 11 | Li$_2$Na$_{1.8}$Ti$_{5.8}$Nb$_{0.2}$O$_{14}$ | 3 | 90 | 5 | 5 | 15 | 2.5 |
| Comparative Example 1 | TiNb$_2$O$_7$ | 3 | 90 | 5 | 5 | 15 | 2.55 |
| Comparative Example 2 | TiNb$_2$O$_7$ | 3 | 85 | 5 | 10 | 15 | 2.55 |
| Comparative Example 3 | TiNb$_2$O$_7$ | 3 | 90 | 5 | 5 | 15 | 2.3 |

TABLE 2

|  | Pressing of Stack After Winding | | | Electrode Group | | Output Performance 5 C/0.2 C Discharge Capacity Ratio (%) |
|---|---|---|---|---|---|---|
|  | Temperature | Load (kN) | Time (min) | Number Cut | Converted into Thickness |  |
| Example 1 | Room Temperature | 80 | 1 | 3 | 0.05 t | 71 |
| Example 2 | Room Temperature | 80 | 1 | 6 | 0.1 t | 74 |
| Example 3 | Room Temperature | 80 | 1 | 12 | 0.2 t | 77 |
| Example 4 | Room Temperature | 80 | 1 | 6 | 0.1 t | 73 |
| Example 5 | 60° C. | 80 | 1 | 2 | 0.03 t | 71 |
| Example 6 | Room Temperature | 80 | 1 | 10 | 0.17 t | 78 |
| Example 7 | Room Temperature | 80 | 1 | 5 | 0.08 t | 70 |
| Example 8 | Room Temperature | 80 | 1 | 7 | 0.12 t | 78 |
| Example 9 | Room Temperature | 80 | 1 | 9 | 0.15 t | 75 |
| Example 10 | Room Temperature | 80 | 1 | 12 | 0.2 t | 74 |
| Example 11 | Room Temperature | 80 | 1 | 2 | 0.03 t | 70 |
| Comparative Example 1 | Room Temperature | 30 | 0.5 | 0 | 0 t | 66 |
| Comparative Example 2 | Room Temperature | 80 | 1 | 16 | 0.27 t | 65 |
| Comparative Example 3 | Room Temperature | 30 | 0.5 | 0 | 0 t | 61 |

The lengths of the cut portions in the respective electrode groups are shown in Table 3 below, as proportions with respect to the length (first length $L_A$) of the electrode groups in the winding axis direction. In addition, the dimensions (first length $L_A$/second length $L_B$) of the electrode groups are also shown.

TABLE 3

|  | Electrode Group | |
|---|---|---|
|  | Length of Cut Portion | $L_A/L_B$ |
| Example 1 | 0.22 $L_A$ | 1.13 |
| Example 2 | 0.29 $L_A$ | 1.14 |
| Example 3 | 0.43 $L_A$ | 1.14 |
| Example 4 | 0.32 $L_A$ | 1.13 |
| Example 5 | 0.16 $L_A$ | 1.13 |
| Example 6 | 0.54 $L_A$ | 1.14 |
| Example 7 | 0.25 $L_A$ | 1.14 |
| Example 8 | 0.36 $L_A$ | 1.13 |
| Example 9 | 0.68 $L_A$ | 1.13 |
| Example 10 | 0.59 $L_A$ | 1.13 |
| Example 11 | 0.13 $L_A$ | 1.10 |
| Comparative Example 1 | (Not Applicable) | 1.13 |

TABLE 3-continued

| | Electrode Group | |
|---|---|---|
| | Length of Cut Portion | $L_A/L_B$ |
| Comparative Example 2 | 0.82 $L_A$ | 1.13 |
| Comparative Example 3 | (Not Applicable) | 1.13 |

As shown in the above tables, a comparison among Examples 1 to 3 reveals that the number of cuts in the electrode group increased as the density of the negative electrode increased. Specifically, in tandem with the increase in the density, the portion in which the cut portions were observed expanded to the thickness of 0.05 t, 0.1 t, and 0.2 t from the innermost lap side of the electrode group. With the 5 C/0.2 C discharge capacity ratio having increased from Example 1 to Example 3, it has been demonstrated that the battery resistance decreased as the proportion of the cut portions increased from the thickness of 0.05 t to 0.1 t, and further to 0.2 t.

A comparison between Example 1 and Example 4 and a comparison between Example 2 and Example 6 confirmed that increasing the pressing time of the electrode group or reducing the particle size of the negative electrode active material led to an increase in the proportion of the cut portions in the thickness direction. In Examples 4 and 6 as well, it was confirmed that the 5 C/0.2 C discharge capacity ratio was higher than those of Examples 1 and 2.

In Example 7, it was confirmed that the proportion of the cut portions decreased as the particle size of the negative electrode active material was increased, as opposed to Example 6, and that the 5 C/0.2 C discharge capacity ratio decreased in tandem with the decrease in the proportion of the cut portions. Also, in Example 8, it was confirmed that the proportion of the cut portions decreased as the thickness of the current collector was increased. In Example 8, improvement of the 5 C/0.2 C discharge capacity ratio was seen; however, this is assumed to be due to an increase in the proportion of the current collector as an electrically conductive member in the negative electrode.

It was also confirmed that the proportion of the cut portions in the thickness direction increased as the amount of the electro-conductive agent or the amount of the binder contained in the electrode was increased as in the case of Examples 9 and 10. In Examples 9 and 10 as well, it was confirmed that the 5 C/0.2 C discharge capacity ratio was higher than that of Example 1.

Example 11 is an example in which a different class of negative electrode active material from those of Examples 1 to 10 was used. In Example 11 as well, the cut portions were formed in the section up to a thickness of 0.2 t from the innermost periphery of the electrode group, and a 5 C/0.2 C discharge capacity ratio comparable to those of Examples 1 to 10 was obtained.

In Comparative Examples 1 and 3, it was confirmed that when the pressing of the electrode group was insufficient, a slit such as a cut portion or a notch was not formed in the portion on the innermost lap of the electrode group. In Comparative Examples 1 and 3, it was demonstrated that the 5 C/0.2 C discharge capacity ratio was low as compared to those of Examples 1 to 10, and the battery resistance was relatively high. It is assumed from these results that the output performance was limited due to the portion of the negative electrode corresponding to the innermost lap in the arc-shaped section, where a charge-discharge reaction does not proceed well, remaining as is in the electrode groups produced in Comparative Examples 1 and 3.

In Comparative Example 2, it was confirmed that when the amount of the binder was excessive, cut portions were formed over a broader range along the thickness of the electrode group beyond the portion up to a thickness of 0.2 t from the innermost lap of the electrode group. In Comparative Example 2, it was demonstrated that the 5 C/0.2 C discharge capacity ratio was low as compared to those of Examples 1 to 10, and the battery resistance was relatively high. It is assumed from these results that the battery resistance increased in the electrode group produced in Comparative Example 2 because electron conduction paths within the negative electrode were dismembered.

According to one or more embodiment and example described above, an electrode group is provided. The electrode group includes a positive electrode and a negative electrode. The negative electrode includes a titanium-containing oxide. The electrode group includes a stack including the positive electrode and the negative electrode. The electrode group has a wound structure of flat shape where the stack is wound with its center positioned lying along a first direction. A wound cross-section of the wound structure orthogonal to the first direction includes an innermost lap and an outermost lap. Among the negative electrode, at least a part of a portion positioned along a longest straight line in the wound cross-section, within a thickness of 0.2 t with respect to a thickness t from the innermost lap to the outermost lap along the longest straight line, includes a slit that lies along the first direction. Electrical resistance is suppressed in the electrode group, whereby a secondary battery and battery pack excellent in output performance can be provided, and a vehicle including the battery pack can be provided.

While certain embodiments of the present invention have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiment described herein may be made without departing from the spirit of the invention. The accompanying claims and their equivalents are intended to cover such embodiments or modifications as would fall within the scope and spirit of the inventions.

What is claimed is:

1. An electrode group comprising:
    a positive electrode; and
    a negative electrode comprising a titanium-containing oxide,
    the electrode group having a wound structure of a flat shape in which a stack comprising the positive electrode and the negative electrode is wound such that a center of the wound structure lies along a first direction,
    a wound cross-section of the wound structure orthogonal to the first direction comprising an innermost lap and an outermost lap,
    at least a part of a portion of the negative electrode comprising a slit that lies along the first direction, the portion of the negative electrode being positioned within a thickness of 0.2 t from the innermost lap along a longest straight line in the wound cross-section with respect to a thickness t from the innermost lap to the outermost lap along the longest straight line, and
    a first length $L_A$ of the electrode group in the first direction and a second length $L_B$ of the electrode group in a second direction parallel to the longest straight line satisfying a relationship of $1<L_A/L_B<5$.

2. The electrode group according to claim 1, wherein a length of the slit is in a range of $0.3\,L_A$ to $0.8\,L_A$ with respect to the first length $L_A$.

3. The electrode according to claim 1, wherein the titanium-containing oxide comprises a compound represented by $Li_xTi_{1-y}M1_{y+z}Nb_{2-z}O_{7-\delta}$ where M1 is at least one selected from the group consisting of Mg, Fe, Ni, Co, W, Ta, and Mo, $0 \leq x \leq 5$, $0 \leq y \leq 1$, $0 \leq z < 2$, and $-0.3 \leq \delta \leq 0.3$.

4. The electrode according to claim 1, wherein the titanium-containing oxide comprises a compound represented by $Li_{2+a}M\alpha_{2-b}Ti_{6-c}M\beta_dO_{14+\sigma}$ where $M\alpha$ is at least one selected from the group consisting of Sr, Ba, Ca, Mg, Na, Cs, Rb and K, MP is at least one selected from the group consisting of Zr, Sn, V, Nb, Ta, Mo, W, Y, Fe, Co, Cr, Mn, Ni and Al, $0 \leq a \leq 6$, $0 \leq b \leq 2$, $0 \leq c \leq 6$, $0 \leq d < 6$, and $-0.5 \leq \sigma \leq 0.5$.

5. The electrode group according to claim 1, wherein the positive electrode includes at least one selected from the group consisting of lithium manganese composite oxide and lithium nickel cobalt manganese composite oxide.

6. A secondary battery comprising:
the electrode group according to claim 1; and
an electrolyte.

7. A battery pack comprising the secondary battery according to claim 6.

8. The battery pack according to claim 7, further comprising an external power distribution terminal and a protective circuit.

9. The battery pack according to claim 7, comprising plural of the secondary battery, the secondary batteries being electrically connected in series, in parallel, or in combination of in-series connection and in-parallel connection.

10. A vehicle comprising the battery pack according to claim 7.

11. The vehicle according to claim 10, wherein the vehicle comprises a mechanism configured to convert kinetic energy of the vehicle into regenerative energy.

* * * * *